(12) United States Patent
Dell'anno et al.

(10) Patent No.: US 10,192,051 B2
(45) Date of Patent: Jan. 29, 2019

(54) DATA ACCELERATION

(71) Applicant: Accenture Global Services Limited, Dublin 4 (IE)

(72) Inventors: Vincent Dell'anno, Denver, CO (US); Sonali Parthasarathy, Mountain View, CA (US); Carl M. Dukatz, San Jose, CA (US); Colin Anil Puri, San Jose, CA (US); Nathan Shetterley, San Francisco, CA (US); Scott Kurth, San Francisco, CA (US); Michael Wendt, Alexandria, VA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 194 days.

(21) Appl. No.: 15/184,664

(22) Filed: Jun. 16, 2016

(65) Prior Publication Data
US 2016/0373476 A1 Dec. 22, 2016

Related U.S. Application Data

(60) Provisional application No. 62/181,150, filed on Jun. 17, 2015.

(51) Int. Cl.
*G06F 21/55* (2013.01)
*H04L 29/06* (2006.01)
(Continued)

(52) U.S. Cl.
CPC ...... *G06F 21/554* (2013.01); *G06F 17/30563* (2013.01); *G06F 21/552* (2013.01);
(Continued)

(58) Field of Classification Search
CPC ............. G06F 21/552; G06F 21/554; G06F 17/30563; G06N 99/005; H04L 63/1425
See application file for complete search history.

(56) References Cited

U.S. PATENT DOCUMENTS 7,735,141 B1 6/2010 Noel
9,112,895 B1 8/2015 Lin
(Continued)

FOREIGN PATENT DOCUMENTS

WO 2014/171926 10/2014

*Primary Examiner* — Brandon S Hoffman
*Assistant Examiner* — Thong P Truong
(74) *Attorney, Agent, or Firm* — Mannava & Kang, P.C.

(57) ABSTRACT

According to an example, data acceleration may include receiving indications of levels of capabilities respectively needed for data movement, data processing, and data interactivity, and/or operational parameters associated with the data movement, the data processing, and the data interactivity. Data acceleration may further include determining, based on an analysis of the received indications and/or the operational parameters, specifications for the data movement to include streaming and/or batch, the data processing to include a big data platform, complex event processing, and/or an appliance, and the data interactivity to include an in-memory database (IMDB) and/or a distributed cache. Further, data acceleration may include generating, based on the determined specifications, a data acceleration architectural layout to meet the levels of capabilities respectively needed for the data movement, the data processing, and the data interactivity, and/or the operational parameters associated with the data movement, the data processing, and the data interactivity.

20 Claims, 28 Drawing Sheets

(51) Int. Cl.
    *G06N 99/00*     (2010.01)
    *G06F 17/30*     (2006.01)

(52) U.S. Cl.
    CPC ....... *G06N 99/005* (2013.01); *H04L 63/1425* (2013.01); *G06F 2221/034* (2013.01)

(56) References Cited

U.S. PATENT DOCUMENTS

| | | |
|---|---|---|
| 2002/0082886 A1 | 6/2002 | Manganaris et al. |
| 2005/0203927 A1 | 9/2005 | Sull et al. |
| 2007/0226796 A1 | 9/2007 | Gilbert |
| 2012/0137367 A1 | 5/2012 | Dupont et al. |
| 2012/0151509 A1 | 6/2012 | McCarthy et al. |
| 2012/0290793 A1 | 11/2012 | Chung et al. |
| 2013/0110761 A1 | 5/2013 | Viswanathan et al. |
| 2013/0318615 A1 | 11/2013 | Christodorescu et al. |
| 2014/0096249 A1 | 4/2014 | Dupont |
| 2014/0222726 A1* | 8/2014 | Mermoud ............ G06N 99/005 706/12 |
| 2015/0033084 A1 | 1/2015 | Sasturkar |
| 2015/0096024 A1 | 4/2015 | Haq et al. |
| 2015/0106324 A1 | 4/2015 | Puri et al. |
| 2015/0121518 A1 | 4/2015 | Shmueli et al. |
| 2015/0134797 A1 | 5/2015 | Theimer et al. |
| 2016/0224899 A1 | 8/2016 | Nguyen |
| 2017/0013003 A1 | 1/2017 | Samuni |
| 2017/0124483 A1 | 5/2017 | Huang |

\* cited by examiner

TABLE 1
Architectural Layouts

| Architectural Layout | Movement | Processing | Interactivity |
|---|---|---|---|
| Appliance only | Second Level | Second Level | Second Level |
| BDP to Appliance | Second Level | Second Level | Second Level |
| Streaming to Appliance | Second Level | Second Level | Second Level |
| BDP Only | Second Level | First Level | First Level |
| Streaming to BDP | Second Level | Second Level | First Level |
| BDP - In-Memory Analytics | Second Level | Second Level | Second Level |
| Streaming to BDP - In-Memory Analytics | Second Level | Second Level | Second Level |
| BDP with Query Processor | Second Level | First Level | Second Level |
| Streaming to BDP - Query Processor | Second Level | Second Level | Second Level |
| Dist. Cache Cluster only | Second Level | First Level | Second Level |
| BDP to cache cluster | Second Level | First Level | Second Level |
| IMDB only | Second Level | First Level | Second Level |
| BDP to IMDB | Second Level | First Level | Second Level |
| Streaming to IMDB | Second Level | Second Level | Second Level |

Fig. 1C

DATA ACCELERATION

CROSS-REFERENCE TO RELATED APPLICATION(S)

This application claims the benefit of Provisional Patent Application Ser. No. 62/181,150, filed Jun. 17, 2015, which is expressly incorporated herein by reference.

BACKGROUND

Enterprise environments typically generate log files to record a variety of activities. Log content analytics (LCA) is the application of analytics and semantic technologies to consume and analyze heterogeneous computer-generated log files to discover and extract relevant insights in a rationalized and structured form.

BRIEF DESCRIPTION OF DRAWINGS

Features of the present disclosure are illustrated by way of examples shown in the following figures. In the following figures, like numerals indicate like elements, in which

FIG. 1C illustrates architectural layouts related to the data acceleration apparatus of FIG. 1, according to an example of the present disclosure;

DETAILED DESCRIPTION

Figure 1A:
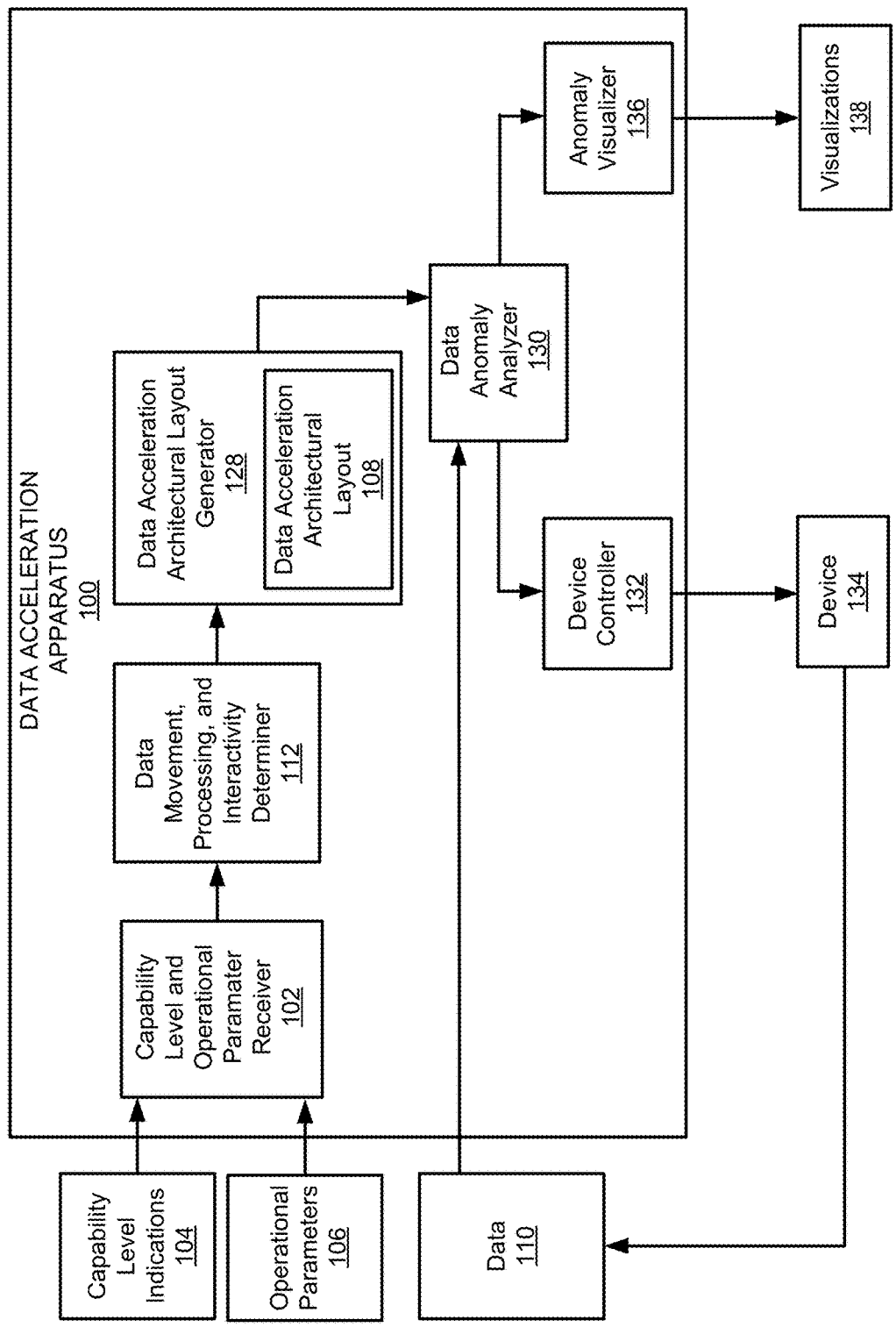
FIG. 1A illustrates an architecture of the data acceleration apparatus, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

The opaque nature of modern computing and networking systems makes them vulnerable to cyber adversaries or advanced persistent threats (APTs) presenting an ever growing threat to globally interconnected networks. Many enterprise environments need to manage copious amounts of log files where forensic evidence of those threats and suspect anomalies reside unnoticed in logs until it may be too late. Analyzing log data from many heterogeneous sources to find errors and anomalies can be difficult, both in terms of computation and information technology (IT) coordination. Learning the behavior of applications through log traces, understanding the flow of events that occur within many applications, performing analytics at massive scales, and performing analytics with low latency and rapid results with streaming data is needed when finding relevant security events and being operationally aware in real-time. Often data present in log files, or trace data, generated from a device source is characterized by attributes that include unique identifiers, timestamps, events, and actions. These unique attributes can be indicative of application behaviors, processes, and patterns created by a series of events. Data contained within the trace sources can be modeled as a graph containing information about states and transitions between them.

In order to address the aforementioned challenges related to log file analysis, a data acceleration apparatus, and methods for data acceleration are disclosed herein. The methods for data acceleration may substantially perform the functionality related to the data acceleration apparatus. With respect to data acceleration, the apparatus and methods disclosed herein facilitate the movement of data swiftly from its source to places in an organization where the data is needed as disclosed herein with respect to FIG. 1B and data movement, processing of the data to gain actionable insights as quickly as possible as disclosed herein with respect to FIG. 1B and data processing, and the fostering of interactivity based on faster responses to queries submitted by users or applications as disclosed herein with respect to FIG. 1B and data interactivity. The apparatus and methods disclosed herein may include monitoring of agent behaviors (e.g. users, applications, servers, etc.) to produce situationally aware graphs that represent views of actions taken on a network by various entities in real-time as disclosed herein with respect to FIGS. 21A-21E. The apparatus and methods disclosed herein may expand upon domain knowledge in the corporate, cyber security, defense, and academic realms concerning the application of analytics to uncover anomalies such as intrusion attempts and difficult to detect surreptitious APTs as disclosed herein with respect to FIGS. 21A-21E. Armed with an ever-watching tool, capable of evolving over time providing context to events, an analyst may be confident that the tool will generate alerts, quarantine and control agents, and stop malicious behavior before irreparable damage occurs to the enterprise and its assets. The apparatus and methods disclosed herein may provide an architecture that provides a robust technology platform integration to process both streaming information and batch information for model creation and testing.

With respect to the apparatus and methods disclosed herein, behavior learning may denote learning common behaviors that occur within an Enterprise network and transforming the behaviors into probabilistic event graphs (based on extract-transform-load or ETL, distributed storage, distributed processing, and machine learning).

With respect to the apparatus and methods disclosed herein, anomaly identification may denote understanding why events are more important than others and identifying anomalous events (utilizing machine learning techniques).

With respect to the apparatus and methods disclosed herein, real-time anomaly detection may denote detecting event chains with highly anomalous attributes based on learned behaviors (which uses messaging queues, CEP, and in-memory databases).

With the vast load of data streaming within a corporate network increasing every day and as are the number of security vulnerabilities and exploits, the human security analyst may become quickly overwhelmed and become reactive rather than proactive.

In this regard, the apparatus and methods disclosed herein may deploy a differentiated technology asset that may effectively capture, learn, discover and provide actionable contextually relevant security information utilizing a data acceleration pipeline. For the apparatus and methods disclosed herein, network traffic patterns may be learned, anomalies may be extracted and graded, and rules may be created to inform key security activities for hunter teams in exploration, forensics, auditing, and decision-making. Furthermore, the apparatus and methods disclosed herein may complete the explanation of security events through example visualizations that increase usability and enable faster insight.

For the apparatus and methods disclosed herein, graph analysis matching techniques may be applied to tagged and ordered data representing agent behaviors (e.g., users, applications, servers, etc.). Incoming data may be associated with appropriate metadata. The data may be gathered from one or more sources for multiple agents from a particular source (e.g., application trace entries/log entries from a particular server). All observed and learned agent behavior may then be represented as a set of graphs, and algorithms may be applied to discover what is typical and what is anomalous. These learned behaviors may be mined for typical and irregular patterns to determine anomalousness of events and a compound set of events. This methodology creates models of behavior that can be segmented by users, roles, and groups as well as the degree of anomaly. Additionally the apparatus may learn information in both on-line and off-line modalities to create an ecosystem balance between responsivity, or sensitivity, of models and accuracy of any findings reported by graph models.

The apparatus and methods disclosed herein may provide for the application of log content analytics and trace event analytics to detect application behaviors and detect anomalies, and to provide guidance to those individuals seeking to understand the data present within log files.

The apparatus and methods disclosed herein may utilize machine learning techniques and open source technologies to increase data literacy and enable downstream security engagements.

The apparatus and methods disclosed herein may discover the existence of aberrations and other phenomena within incoming trace events as they occur in real-time.

The apparatus and methods disclosed herein may provide a contextual and intuitive metric for anomalous behaviors and patterns that exist within trace events as they emerge. Insight gained from real-time analysis may provide information that can be of use proactively and provide a metric for the contextual anomalousness of an event sequence when compared to the probability distribution of patterns present within an overall mined graph.

Additionally, the apparatus and methods disclosed herein may evolve over time and be adjusted for increased sensitivity for specific time periods as threats may evolve and agents may attempt to circumvent and evade detection.

The apparatus and methods disclosed herein may deliver a set of interactive visualizations explaining the underlying network ecosystem and threats as they occur through the use of visualization tools. The expressive and innovative visualizations may convey the importance of anomalies, which might otherwise go unnoticed.

The apparatus and methods disclosed herein may provide graph analytics and pattern matching techniques to detect anomalies throughout several stages of the cyber kill chain to discover APTs.

The apparatus and methods disclosed herein may encompass online capabilities with CEP techniques. The apparatus and methods disclosed herein may provide for the implementation of a data acceleration pipeline to deliver insight with rapid interactive visualizations utilizing a big data and a big memory backbone. Big data may be described a data set that is so large or complex that traditional data processing applications may be inadequate.

With respect to cyber security, the apparatus and methods disclosed herein may provide new ways to combat APTs, and include visualization and other tools that assist end-users with threat detection.

The apparatus and methods disclosed herein may ascertain known states and behaviors, and detect correlations across graphs using various techniques in graph theory, statistics, and probability.

The apparatus and methods disclosed herein may provide information concerning how closely events across logs sources are related to each other.

The apparatus and methods disclosed herein may implement a scalable and performant technique for collecting tag-and-track information of multiple sources, implement a platform environment suitable for integration testing and system validation, implement a CEP technology capable of evaluating policies in real-time, and define enforcement capability within the apparatus and enable enforcement of policies.

In addition to the collecting and processing environments, enabling enforcement of security policies is non-trivial. Application processes may be blocked at many different levels (e.g., application, operating system, hardware, network, etc.) and enforcement techniques may be dependent on the implementation level of the technology. The apparatus and methods disclosed herein may include the creation of technology enforcement reference capability architectures to define the level of enforcement which may be expected based on the complexity of the technology environment deployment. These aspects may be used to identify the optimal enforcement points while minimizing the impact of the network as a whole.

The apparatus and methods disclosed herein may include the implementation of a command and control system to enable the enforcement. The apparatus and methods disclosed herein may leverage visualization to increase usability and enable faster insight.

The apparatus and methods disclosed herein may include the flexibility of an application containerization to enable architecture which is portable, scalable, fault-tolerant and an efficient solution which may operate in heterogeneous hardware environment. In addition to containerization, the apparatus and methods disclosed herein may use distributed storage, message queuing and CEP to provide a robust transport and processing environment. When constructed in a modular manner, additional components may be added to the data pipeline as needed. The apparatus and methods disclosed herein may include interoperability with each of the components through common standards and open source technology. The apparatus and methods disclosed herein may provide for creation of on-line and off-line modalities for analysis. Further, for the apparatus and methods disclosed herein, enforcement may require processing of tags and tag graphs as they occur and forensic analysis, where historical events may be stored.

With respect to global infrastructure, the apparatus and methods disclosed herein may include a simulator platform for an entire global infrastructure composed of multiple multi-tier datacenters connected through networks across continents.

With respect to application diversity, the apparatus and methods disclosed herein may represent any software application and provide the capability of intertwining multiple workloads. Each application may be modeled as a series of client operations, which in turn are decomposed into trees of messages. These messages may flow concurrently through the infrastructure allocating hardware resources.

With respect to background jobs, the apparatus and methods disclosed herein may provide for simulation of background processes, such as replication or indexing, running simultaneously with user generated workloads.

As disclosed herein, the apparatus and methods disclosed herein facilitate the movement of data swiftly from its source to places in an organization where the data is needed, processing of the data to gain actionable insights as quickly as possible, and the fostering of interactivity based on faster responses to queries submitted by users or applications.

With respect to data movement, which includes the transport of data into a system, bringing data into an organization may include a relatively slow process of collecting the data in a staging area and then transforming the data into the appropriate format. The data may then be loaded to reside in one source, such as a mainframe or an enterprise data warehouse. From the mainframe or the enterprise data warehouse, the data may be directly transferred in a point-to-point manner to a data mart for users and applications to access. However, with the substantial increase in data volumes and variety, such a process may be ineffective. With respect to data movement, some data may exist as log files on external systems that have to be transported to an organization's data infrastructure for future use. Other sources provide streaming data, which is piped into a system in real time. In this regard, for the apparatus and methods disclosed herein, data acceleration helps organizations manage data movement by enabling multiple techniques of bringing data into an organization's data infrastructure and ensuring that that data can be referenced quickly.

With respect to data processing, data may be processed to extract actionable insights. However, with the advent of big data, the volume and variety of data requiring processing has exponentially increased. In order to address the challenges associated with data processing of big data, the apparatus and methods disclosed herein may provide for analytics including the performance of calculations on big data, creation and execution of simulation models, and comparison of statistics to derive new insights from big data. In this regard, for the apparatus and methods disclosed herein, data acceleration supports faster processing by implementing computer clusters.

With respect to data interactivity, data interactivity includes providing results of analytics as quickly as possible to a user or application/another application by analyzing memory databases and distributed caches. For example, when users or applications submit queries, the queries are expected to be performed in an acceptable amount of time. With the rise of big data, responses to such queries may take minutes or even hours. In this regard, for the apparatus and methods disclosed herein, data acceleration supports faster interactivity by enabling users and applications to connect to the data infrastructure in universally acceptable ways, and by ensuring that query results are delivered as quickly as required.

The apparatus and methods disclosed herein may address the aforementioned challenges with respect to data movement, data processing, and data interactivity by categorizing these aspects with respect to a big data platform (BDP), data ingestion, complex event processing (CEP), an in-memory database (IMDB), cache clusters, and an appliance.

A BDP may be described as a distributed file system and compute engine that may be used to facilitate data movement and processing. BDPs include a big data core (BDC) with a distributed data storage/computer cluster with distributed data storage, computing power, and may function as a platform for additional computing including data interactivity. For example, advancements in big data technologies have enabled BDCs to function as a platform for additional types of computing, some of which (e.g., query processors) may specifically support data interactivity. Additional enhancements to a big data core focus on creating fast interfaces with data on a cluster. The big data core may store semi-structured data (such as Extensible Markup Language (XML) and JavaScript Object Notation (JSON)™, and unstructured data (word documents, PDFs, audio files, and videos), and may employ map/reduce functionality to read. Query engine software may enable the creation of structured data tables in the core and common query functionality (such as structured query language (SQL).

Figure 2:
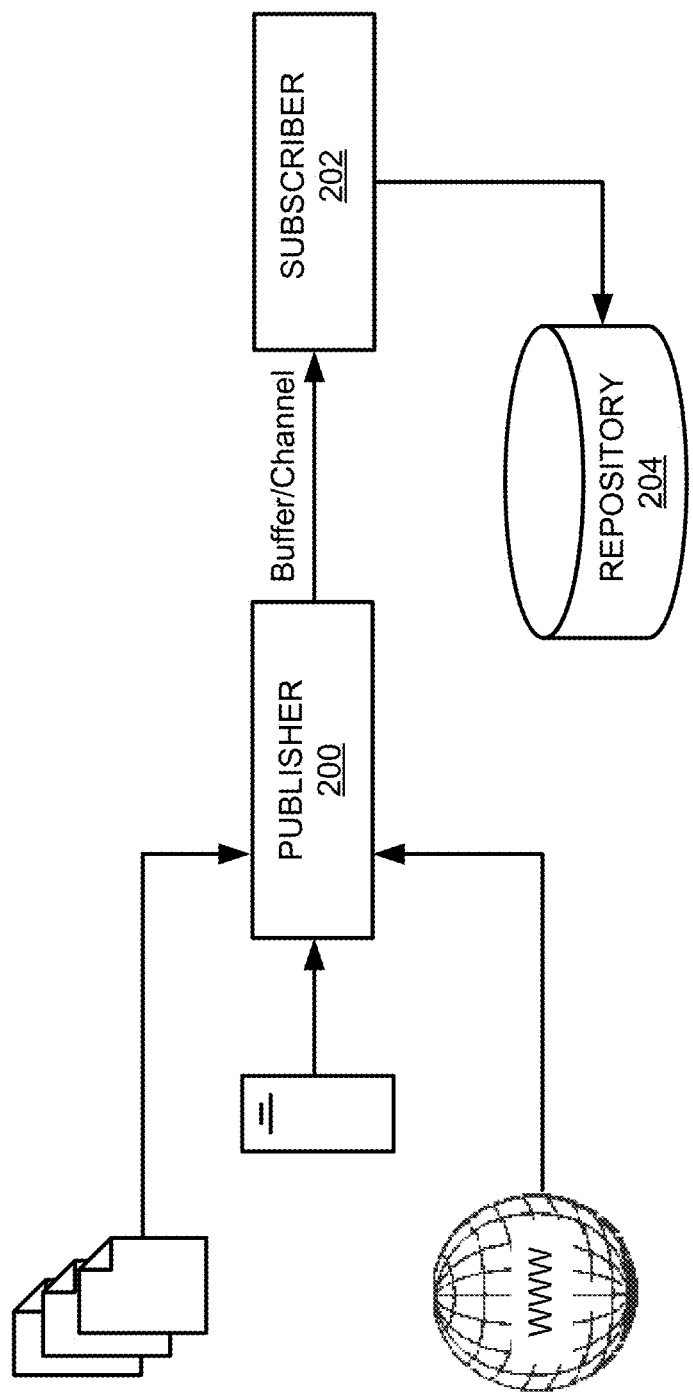
FIG. 2 illustrates data ingestion for the data acceleration apparatus of FIG. 1, according to an example of the present disclosure.

FIG. 2 illustrates data ingestion for the apparatus and methods disclosed herein, according to an example of the present disclosure.

Referring to FIG. 2, data ingestion may pertain to collecting, capturing, and moving data from sources to underlying repositories where users may process the data. One technique of data ingestion may include an extract-transform-load (ETL) technique aimed at ensuring organized and complete data. For modern data infrastructures that are less concerned about the structure of the data as it enters a system, but more focused on making sure the data is collected, data ingestion as disclosed herein may focus on streaming data (e.g., continuous clicks on a website) and queues (i.e., processing of the data in the appropriate order).

Data ingestion may provide a mechanism for capturing data from multiple external sources (each of which may deliver data in different formats and may have different requirements) and quickly transporting the data to a place where the data can be accessed for processing. Alternatively, the data may be static and reside in a repository external to an organization's data infrastructure, or the data may be generated in real time by an external source. Data ingestion may provide the mechanism for accessing and using data in both such scenarios. For the example of FIG. 2, the producer of the data publishes (i.e., at a publisher 200) the data from the source to a buffer or channel (data holding area). A subscriber 202 (e.g., user or consumer) of the data picks the data up from the buffer or channel. A queuing mechanism allows data to be buffered while waiting for producers and consumers to take their respective actions. The speed of data producers' and consumers' actions determines the size of the buffer and the queue. For the apparatus and methods disclosed herein, robust ingestion may support data acceleration by enabling large amounts of data to be collected and stored quickly. For example, the data may be stored in a repository 204 as shown in FIG. 2.

Figure 3:
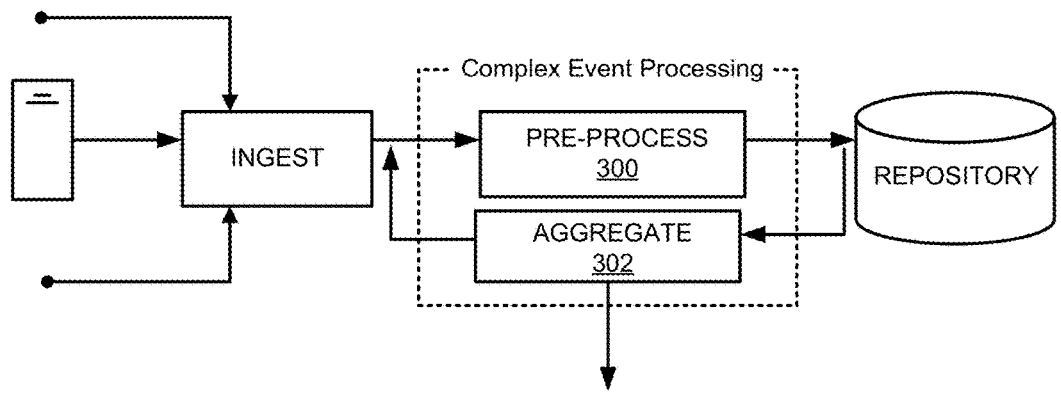
FIG. 3 illustrates complex event processing (CEP) for the data acceleration apparatus of FIG. 1, according to an example of the present disclosure.

FIG. 3 illustrates CEP for the apparatus and methods disclosed herein, according to an example of the present disclosure.

Referring to FIG. 3, CEP may be described as tracking and processing streams of event data (e.g., click streams or video feeds) from multiple sources to infer and identify patterns that suggest more complicated circumstances. An example may include validating security events against previously verified breaches of information in real time to assess new threats. CEP may combine data from multiple sources to infer events or patterns that suggest more complicated circumstances. CEP may identify meaningful events (such as opportunities or threats), and enable organizations to respond to such events as quickly as possible. CEP may enhance streaming ingestion. CEP may also increase speed of data analysis by pre-processing data, and caches, where IMDBs enable real-time interactivity. CEP may be used for performing real-time analytics and driving real-time insights. As new data streams in from its sources, the pre-processing at 300 and aggregation at 302 perform the initial pre-processing and transformations to count parts of the data and use the totals to expedite future processing of data batches. The pre-processing and aggregation may be performed by combining historical data with new data, matching the data against pre-determined patterns as well as inferring new patterns in the data, and triggering events and actions based on the detected patterns, delivering real-time insights for decision making. An advantage of CEP is the immediacy of the insights and actions that are facilitated, compared to waiting for an overnight batch-processing job to be completed. The increased processing speed stems from the fact that data movement and processing occur in parallel, backed by in-memory computations. CEP differs from ingestion solutions in that CEP includes the added processing power to perform calculations on the initial data before the data is consumed by a datastore or a file system. For example, with batch processing, a map/reduce job may be performed once all the data (in files) exists. As a map/reduce job may take a relatively long time to execute based on the amount of data, and the complexity of the algorithms in the map/reduce job, in contrast, CEPs operate on one record at a time. Each record or event (in a file) may be consumed by the CEP and is pre-processed (i.e., the data is enriched by adding to it or transforming it). Thus, by using CEP, results may be obtained, or an action may be triggered after every record, instead of waiting for an entire file to process as with batch processing. For example, with batch processing, data may need to be first moved into a system before processing. For CEP, the data may be processed in parallel with movement/ingestion of the data. Thus, with CEP, data movement and processing may be achieved at the same time to increase the speed of data analysis.

Figure 4:
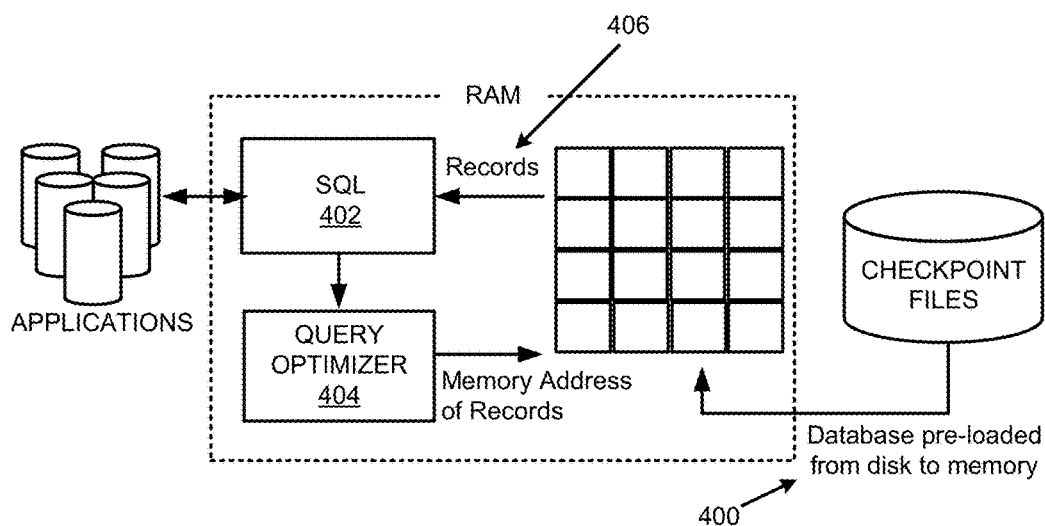
FIG. 4 illustrates an in-memory database for the data acceleration apparatus of FIG. 1, according to an example of the present disclosure.

FIG. 4 illustrates an IMDB for the apparatus and methods disclosed herein, according to an example of the present disclosure.

Referring to FIG. 4, an IMDB may be described as a database management system that relies primarily on main memory for data storage. IMDB differs from database management systems that use a disk storage mechanism. IMDBs include low latency with simpler algorithm internals requiring fewer central processing unit (CPU) instructions and experience faster seek times. Moreover, accessing data in memory eliminates the "seek time" involved in querying data on disk storage, thus providing faster and more predictable performance.

Because IMDBs constrain the entire database and the applications to a single address space, they reduce the complexity of data management. Any data may be accessed within just microseconds.

As shown in FIG. 4, a database may be pre-loaded from disk to memory at 400. An application may issue a query, such as SQL query at 402. The SQL query may be used by a query optimizer 404 to access a memory address of records, where the appropriate records may be retrieved at 406.

Figure 5:
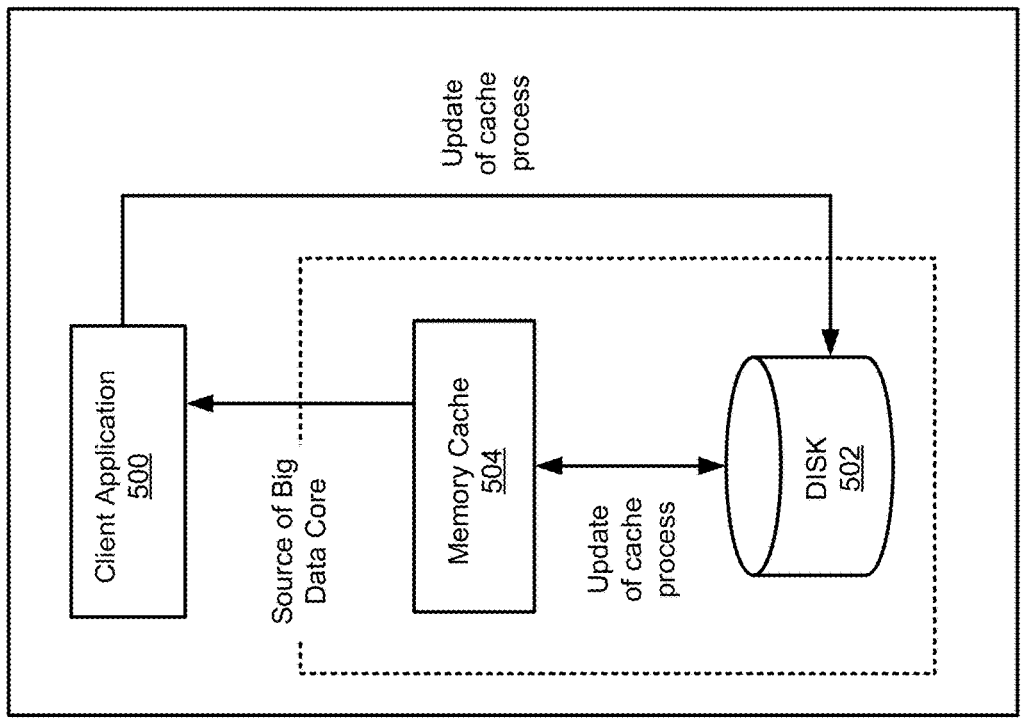
FIG. 5 illustrates a cache cluster for the data acceleration apparatus of FIG. 1, according to an example of the present disclosure.

FIG. 5 illustrates a cache cluster for the apparatus and methods disclosed herein, according to an example of the present disclosure.

Referring to FIG. 5, cache clusters may be described as clusters of servers acting as in memory layer intermediaries with centralized management software mitigating load from upstream data sources to applications and users. Cache clusters may be maintained in memory and may offer high-speed access to frequently accessed data. Cache clusters may reside between the data source and data consumer. Cache clusters may be used when there is an extremely high volume of reads from multiple sources of data that does not change often, or when a database is stored on disk where seek time can be sub-optimal.

Cache clusters perform caching operations on a large scale. For example, cache clusters accommodate operations such as reading and writing values. Cache clusters may be populated when a query is sent from a data consumer (e.g., a client application 500) to a data source (e.g., a disk 502). The results from the data source are then stored in the cache cluster (e.g., the memory cache 504). In this manner, if the same query is received again, the query does not need to be sent to the data source for retrieval by the data consumer. Query receipts build up over time in the cluster. When a data consumer requests data stored in the cluster, then the cluster responds by accessing the data source, unless specific parameters are met (e.g., time since the last refresh). Pre-populating data into a cache cluster with data that is known to be frequently accessed may decrease processing requirements on underlying systems after a system restart. Data grids add support for more complex query operations and certain types of massively parallel processing (MPP) computations.

Figure 6:
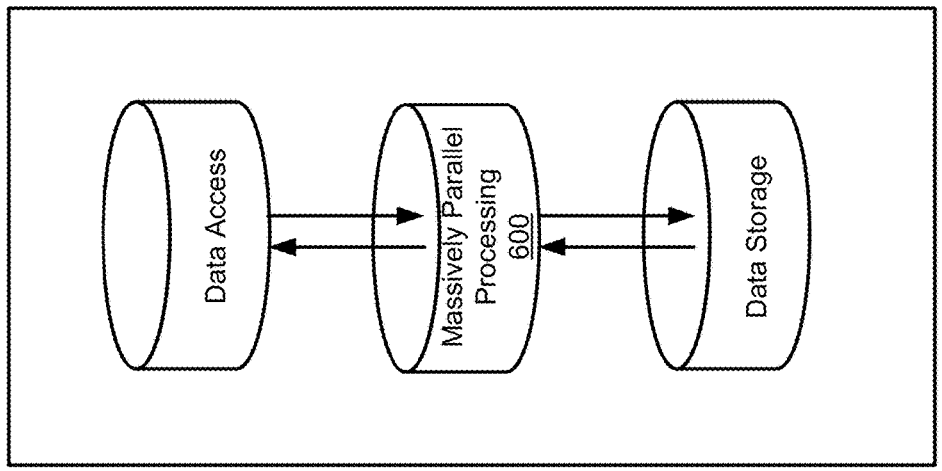
FIG. 6 illustrates appliances for the data acceleration apparatus of FIG. 1, according to an example of the present disclosure.

FIG. 6 illustrates appliances for the apparatus and methods disclosed herein, according to an example of the present disclosure.

Referring to FIG. 6, an appliance may be described as a prepackaged unit of hardware (e.g., servers, memory, storage, and input/output channels), software (operating system, database management system, and administrative management software), and support services built with redundancy to provide reliability, while utilizing a common database for online transaction and analytic processing to reduce system latency. An appliance may include a common database for both online transaction processing and online analytical processing. These aspects reduce delays in data movement, processing, and interactivity.

High-performance databases running on a cluster of servers may be challenging to implement and require specialized knowledge of the system, database, and storage management. System maintenance and software updating are also highly time consuming for system administrators working with such databases. In this regard, appliances offer a way to achieve the benefits of high-performance databases while avoiding the challenges. Appliances may provide the infrastructure and tools needed to build high-performance applications, including anything from core database technology and real-time replication services to lifecycle management and data provisioning. On the hardware side of an appliances, custom silicon (e.g., for circuit boards that may not be available for use outside of the appliance) offers valuable benefits. An example is the use of custom silicon is application-specific integrated circuits (ASICs), which enable developers to create unique solutions tailored to specific needs. Custom silicon also enables development on devices optimized for specific use cases. For example, custom silicon for network optimization provides a unique solution that integrates embedded logic, memory, serializer/deserializer technology, networking cores, and processor cores, all of which may be used to squeeze additional performance gains out of the appliance, providing advantages over non-custom solutions. Based on these capabilities, appliances can support and perform complex calculations on massive amounts of data from across an enterprise, for example, as shown at 600 in FIG. 6. Large volumes of data may be analyzed at unprecedented response times with flexibility, without the need for constant support from vendors.

Technology features that enable on-boarding of data from multiple sources in multiple ways for each architectural layout may be categorized as having enhanced movement options. Stream processing may be seen as a differentiator over patterns, that only offer methods for batch processing. Technology patterns that offer capabilities to customize data allocation for in-memory querying may be seen as including enhanced interactivity.

For the apparatus and methods disclosed herein, the architecture components may operate in conjunction with each other. Different technology stacks may be used to meet the requirements of data movement, data processing, and data interactivity. The technology stacks may be built on common layers. Table 1 of FIG. 1C shows the fourteen (14) architectural layouts along with a classification of whether the architectural layout includes a first level, or a second higher level that addresses different requirements of data movement, data processing, and data interactivity.

The first level (also referred to as a basic level) may be described as a requirement of data movement, data processing, and data interactivity that may include standard functionality. Compared to the first level, the second level (also referred to as an enhanced level) may be described as a requirement of data movement, data processing, and data interactivity that may include a higher level of functionality compared to the standard functionality. For example, the first and second levels may be characterized by the specific mix of architecture components in a stack. The combination of architecture components provides relative speedups which may be either the first or the second level. For example, data processing with a BDP or a cache cluster or an IMDB may be considered as a first level, whereas, the addition of CEP to the stack may enhance speed by pre-processing data to thus designate the addition of the CEP as the second level. Similarly, data interactivity with a BDP or streaming to BDP may be considered as a first level, but adding caches and IMDBs may enable real-time interactivity and is therefore considered second level.

According to Table 1 of FIG. 1C, CEP may enhance streaming ingestion, CEP may increase speed by pre-processing data, and caches and in-memory databases may enable real-time interactivity.

The apparatus and methods disclosed herein may be applicable in a variety of areas such as, for example, anomaly detection and tracking, application debugging, audit or regulatory compliance, digital forensic investigation, error tracking, operational intelligence, security incidence response, security policy compliance, etc.

The apparatus and methods disclosed herein provide technical solutions to technical problems related, for example, to real-time anomaly detection in log file data. In many instances, anomaly detection in log file data can be a daunting task, for example, due to the extensive volume of such log files. In this regard, the apparatus and methods disclosed herein provide the technical solution of selection and implementation of an architecture/platform that can process the data, such as log file data, in a reasonable amount of time. The processing of data may be achieved, for example, by selection of a correct mix of architectural components as disclosed herein to achieve faster processing. Further, the nature of anomaly detection is time sensitive, in that the anomalous data should be detected as soon as the data occurs to be able to trigger an action. In this regard, the apparatus and methods disclosed herein provide for the implementation of CEPs and ingestion mechanisms to analyze the data (or record, or event), as soon as the data is generated and/or accessed. According to an example, the apparatus and methods disclosed herein provide the technical solution of receiving indications of levels of capabilities respectively needed for data movement, data processing, and data interactivity, and/or operational parameters associated with the data movement, the data processing, and the data interactivity. Further, the apparatus and methods disclosed herein provide the technical solution of determining, based on an analysis of the received indications of the levels of capabilities respectively needed for the data movement, the data processing, and the data interactivity, and/or the operational parameters associated with the data movement, the data processing, and the data interactivity, specifications for the data movement to include streaming and/or batch, data processing to include a big data platform, CEP, and/or an appliance, and data interactivity to include an IMDB and/or a distributed cache. Further, the apparatus and methods disclosed herein provide the technical solution of generating, based on the determined specifications, a data acceleration architectural layout to meet the levels of capabilities respectively needed for the data movement, the data processing, and the data interactivity, and/or the operational parameters associated with the data movement, the data processing, and the data interactivity. The apparatus and methods disclosed herein also provide the technical solution of accessing data that is to be analyzed for an anomaly, determining, by using the data acceleration architectural layout, whether the data includes the anomaly, and in response to a determination that the data includes the anomaly, controlling a device associated with the data. In this regard, the apparatus and methods disclosed herein provide the technical solution to a technical problem of detection of an anomaly and/or controlling a device based on detection of an anomaly. For example, a device, such as an automatic teller machine (ATM) may be controlled to initiate a lock-down mode based on the detection of an anomaly related to access to the ATM. According to another example, a network may be placed in a secure mode based on detection of surreptitious APTs. Thus, any type of device may be controlled based on detection of an anomaly related to operation of the device.

Figure 1B:
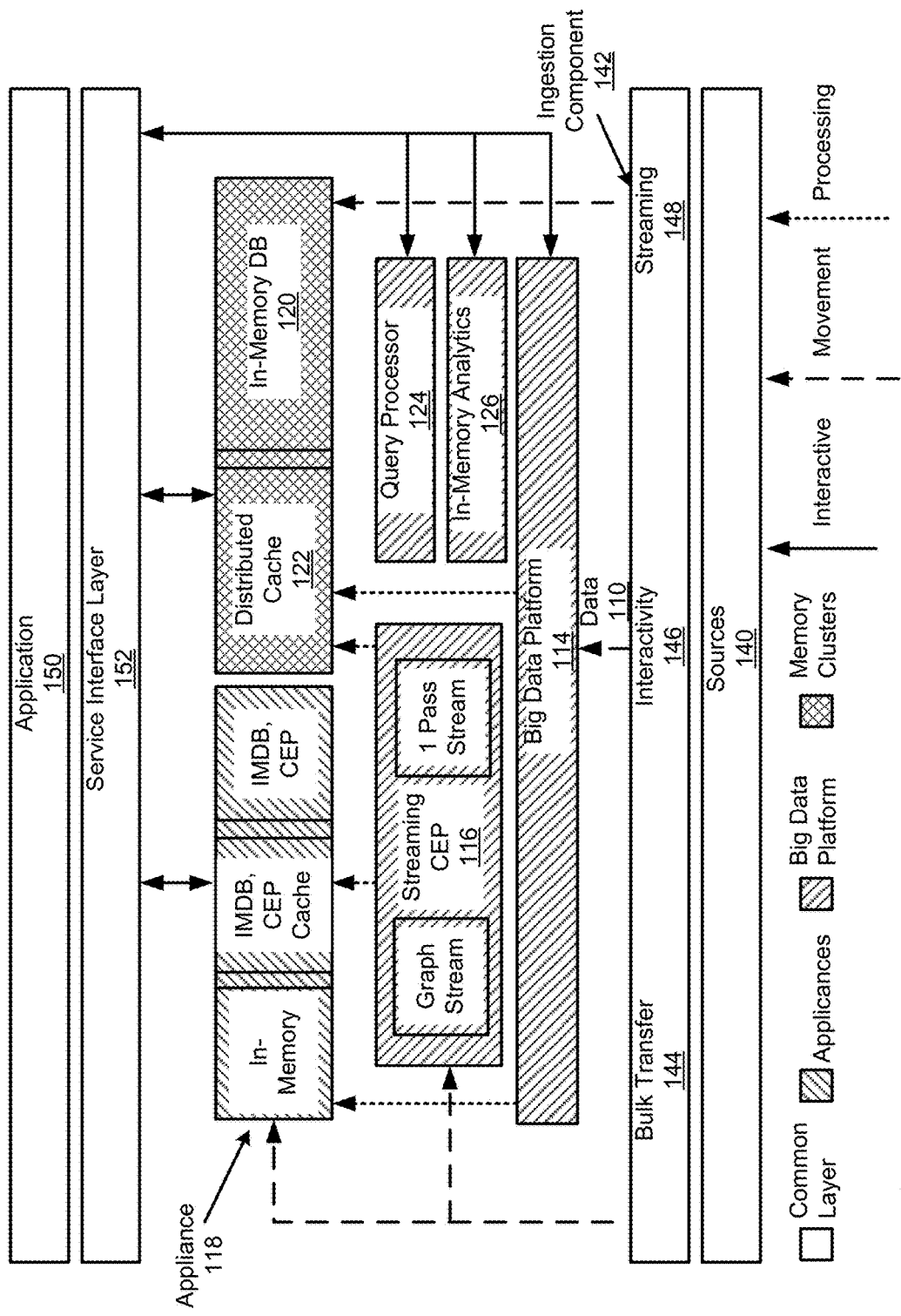
FIG. 1B illustrates a functional diagram related to the data acceleration apparatus of FIG. 1, according to an example of the present disclosure.

FIG. 1A illustrates an architecture of the data acceleration apparatus 100 (hereinafter "apparatus 100"), according to an example of the present disclosure. FIG. 1B illustrates a functional diagram related to the apparatus 100, according to an example of the present disclosure.

Referring to FIGS. 1A and 1B, a capability level and operational parameter receiver 102 may receive (or otherwise access) capability level indications 104 respectively needed for data movement, data processing, and data interactivity, and/or operational parameters 106 associated with the data movement, the data processing, and the data interactivity. As disclosed herein with respect to Table 1 of FIG. 1C, examples of capability levels include a second level which is higher than a first level of capability associated with a data acceleration architectural layout 108 specified by the apparatus 100. Operational parameters 106 may include, for example, an amount of data 110 that is to be analyzed by the data acceleration architectural layout 108, a speed of processing, etc., and other factors associated with components of the data acceleration architectural layout 108. A data movement, processing, and interactivity determiner 112 may determine, based on an analysis of the received capability level indications 104 respectively needed for the data movement, the data processing, and the data interactivity, and/or the operational parameters 106 associated with the data movement, the data processing, and the data interactivity, specifications for the data movement to include streaming and/or batch (i.e., the bulk transfer as disclosed herein), the data processing to include a big data platform 114 (which includes a big data core as illustrated in FIG. 1B), CEP 116, and/or an appliance 118, data interactivity to include an IMDB 120 and/or a distributed cache 122, and further components that include a query processor 124, and in-memory analytics 126. The operation of these components will be described in further detail with reference to FIGS. 7-24. A data acceleration architectural layout generator 128 may generate, based on the determined specifications, the data acceleration architectural layout 108 to meet the levels of capabilities respectively needed for the data movement, the data processing, and the data interactivity. For example, the data acceleration architectural layout generator 128 may generate the data acceleration architectural layout 108 by invoking, based on the specifications, selected ones of the components of FIG. 1B that include the big data platform 114, the CEP 116, the appliance 118, the IMDB 120, the distributed cache 122, the query processor 124, and the in-memory analytics 126. The components of FIG. 1B may be integrated to operate together, prior to being selectively invoked by the data acceleration architectural layout generator 128. The combinations of components that are activated may correspond to combinations disclosed herein with respect to Table 1 of FIG. 1C. A data anomaly analyzer 130 may access data 110 that is to be analyzed for an anomaly. The data anomaly analyzer 130 may determine, by using the data acceleration architectural layout 108, whether the data 110 includes the anomaly. The determination of whether the data 110 includes the anomaly may be performed in real-time based on the data acceleration capabilities provided by the data acceleration architectural layout 108. In response to a determination that the data 110 includes the anomaly, a device controller 132 may control a device 134 associated with the data 110. The device 134 may include a device that supplies the data 110 as shown in FIG. 1A, or a device that does not supply the data 110, but is controlled by the device controller 132. The device 134 may include any type of device including a processor capable of executing machine-readable instructions to perform one or more operations. An anomaly visualizer 136 may generate various types of visualizations 138 to facilitate an identification of anomalies in the data 110.

In some examples, the elements of the apparatus 100 may be machine readable instructions stored on a non-transitory computer readable medium. In this regard, the apparatus 100 may include or be a non-transitory computer readable medium. In some examples, the elements of the apparatus 100 may be hardware or a combination of machine readable instructions and hardware.

Figure 22:
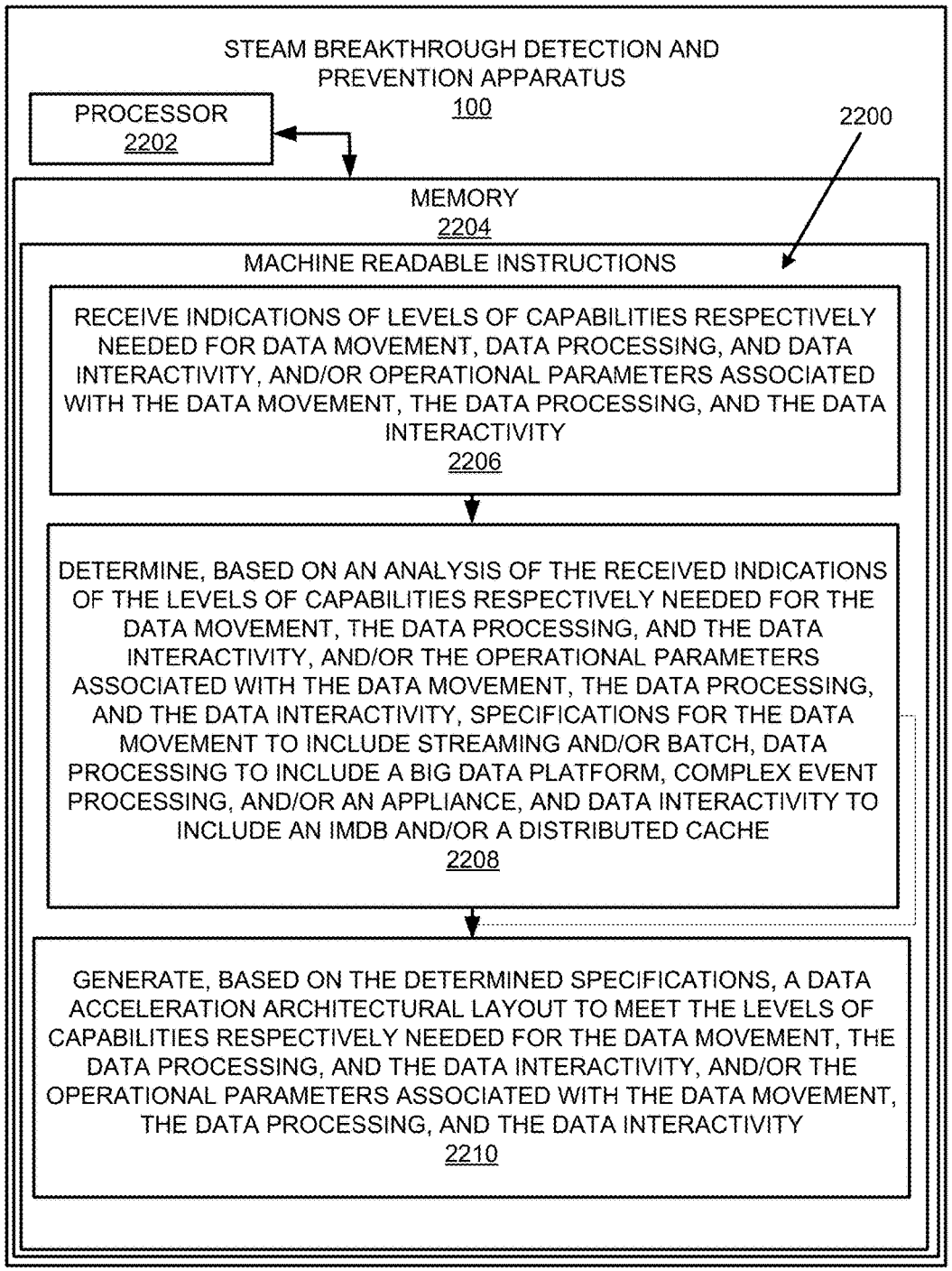
FIG. 22 illustrates a flowchart of a method for data acceleration, according to an example of the present disclosure.

The operations of the apparatus 100 as disclosed herein with respect to the various elements of the apparatus 100 may be performed by a processor (e.g., the processor 2202 of FIG. 22). For example, a processor (e.g., the processor 2202 of FIG. 22) may perform the operations disclosed herein with respect to the capability level and operational parameter receiver 102, the data movement, processing, and interactivity determiner 112, the data acceleration architectural layout generator 128, the data anomaly analyzer 130, the device controller 132, and the anomaly visualizer 136.

Referring to FIG. 1B, with respect to data acceleration, the data 110 may be received into an organization's data infrastructure, processed, and users may interact with the data 110 by submitting queries and receiving responses with which to make decisions. For the apparatus 100, the data origination and exit layers may be common layers, which may be positioned above and below the architecture components in the orientation of FIG. 1B. For example, data sources 140 may feed the ingestion component 142 at the bottom of the apparatus 100 with the data 110 based on bulk transfers 144 (i.e., the batch processing as disclosed herein), interactivity 146, and streaming 148. Further, at the top of the apparatus 100, users and applications (denoted application 150) may interact with the data 110 via a service interface layer 152.

The functional diagram of FIG. 1B may be decomposed into the fourteen (14) architectural layouts that are enumerated in Table 1 of FIG. 1C. The functional diagram of FIG. 1B may serve as starting points for data ingestion, data storage, and data processing. As disclosed herein, for the apparatus 100, the architecture components may operate in conjunction with each other. Different technology stacks (i.e., combinations of the components of FIG. 1B) may be used to meet the requirements of data movement, data processing, and data interactivity. The technology stacks may be built on common layers.

Figure 7:
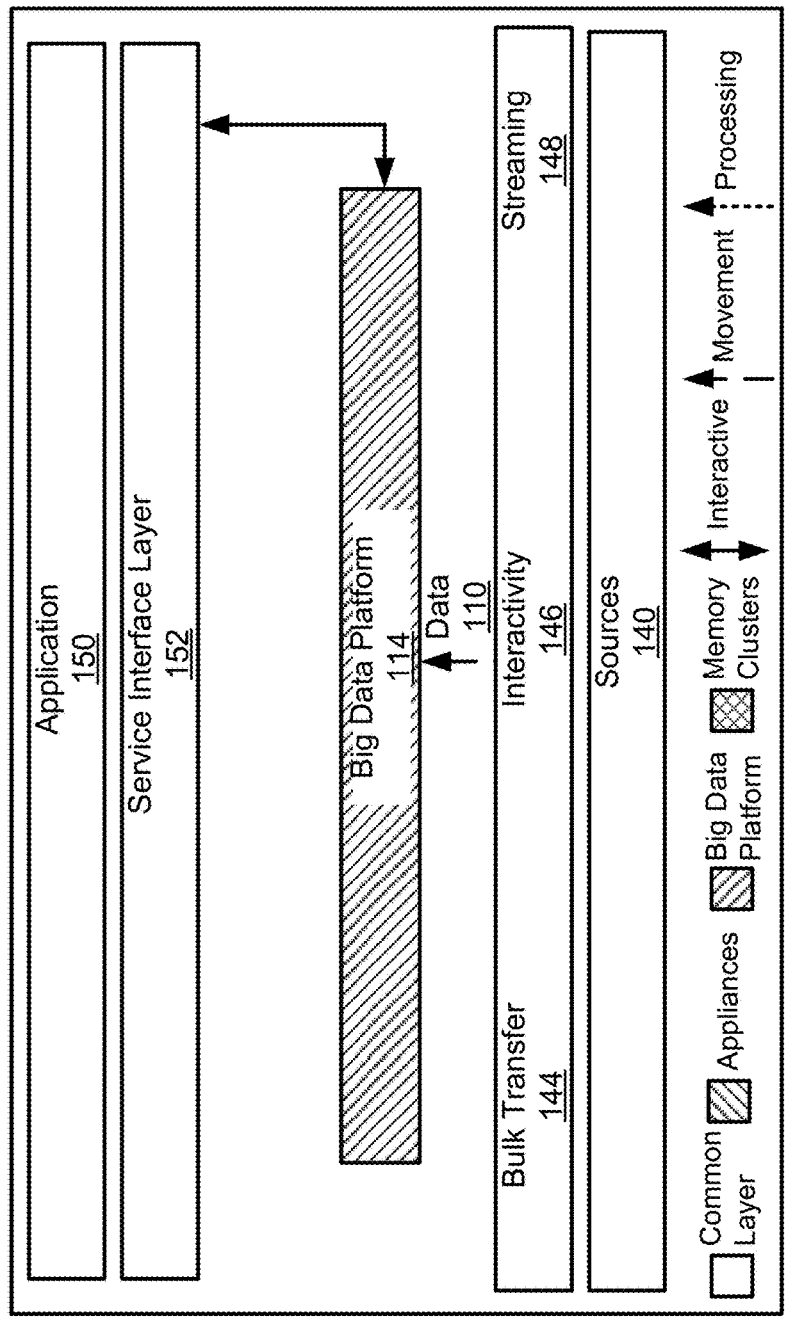
FIG. 7 illustrates a big data platform for the data acceleration apparatus of FIG. 1, according to an example of the present disclosure.

FIG. 7 illustrates a big data platform for the apparatus 100, according to an example of the present disclosure.

Referring to FIG. 7, the data 110 may enter the compute cluster through a batch or streaming process. However, events may not be processed immediately. The big data platform 114 is job based, and calculations are scheduled to run on it at a certain interval rather than being performed in real-time. The big data platform 114 may leverage replication and distributed parallel processing on large datasets, which enables advanced analytics. Applications and services may access the big data platform 114 directly and deliver improved performance on large, unstructured datasets. This can be achieved by directly accessing the underlying Hadoop Distributed File System (HDFS)™ files. Referring to Table 1 of FIG. 1C, the configuration of FIG. 7 including the big data platform 114 may correspond to the "BDP only" architectural layout of Table 1, which provides a second (higher) level of capability with respect to data movement, and a first level of capability with respect to data processing and data interactivity.

Figure 8:
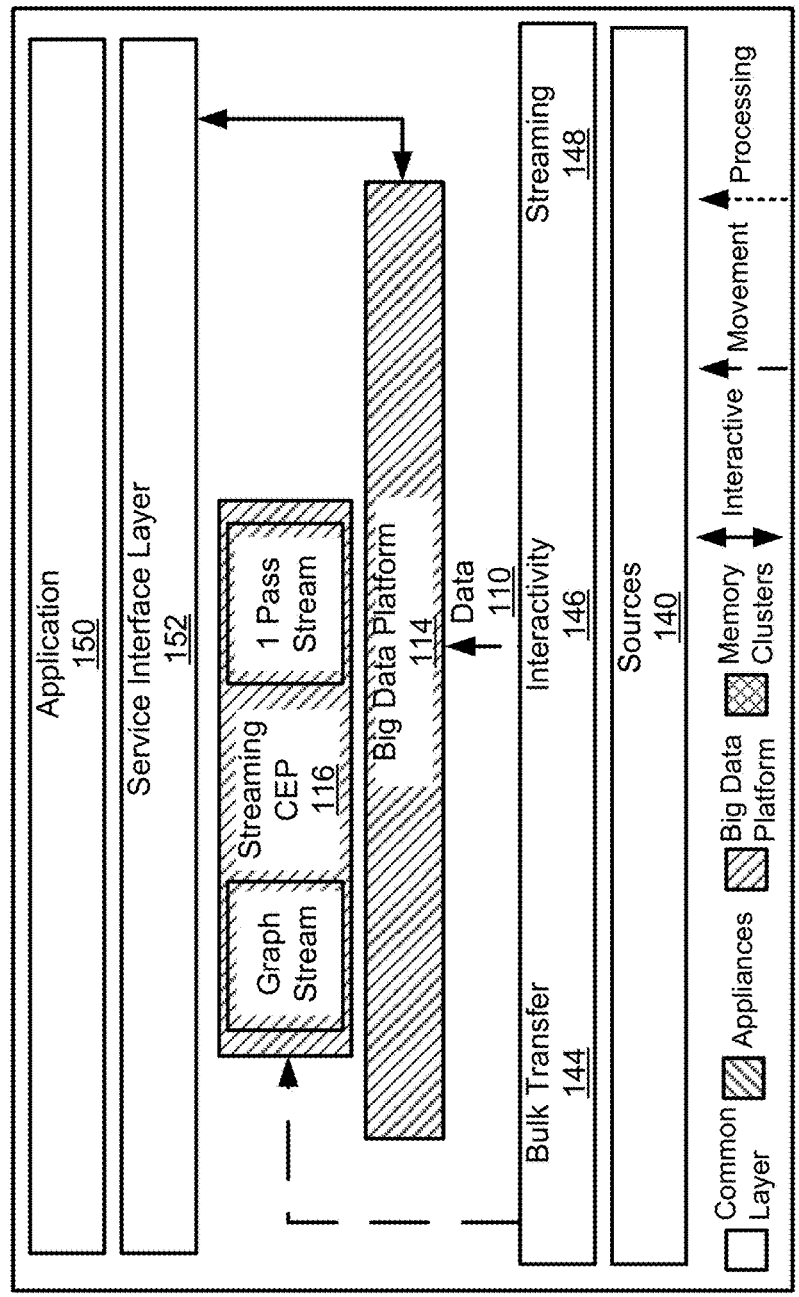
FIG. 8 illustrates a big data platform and CEP for the data acceleration apparatus of FIG. 1, according to an example of the present disclosure.

FIG. 8 illustrates a big data platform and CEP for the apparatus 100, according to an example of the present disclosure.

Referring to FIG. 8, adding the CEP 116 enhances processing capabilities of the big data platform 114, as ingesting data through the CEP 116 enables real-time detection of patterns in the data 110 and event triggering. This functionality is useful for correlating real-time information with an analytic model, for example, when an organization is to be alerted to a security event in real-time. By leveraging processing capabilities on an existing dataset on the big data platform 114, a machine learning model may be created and transferred to the CEP 116. Instead of waiting on jobs for the big data platform 114 to execute, the CEP 116 may take action immediately, drawing on criteria generated in the model. The CEP 116 thus enhances the processing capabilities of the big data platform 114, and augments interactivity of components by enabling real-time animated dashboards. Referring to Table 1 of FIG. 1C, the configuration of FIG. 8 including the big data platform 114 and the CEP 116 may correspond to the "Streaming to BDP" architectural layout of Table 1, which provides a second (higher) level of capability with respect to data movement and data processing, and a first level of capability with respect to data interactivity.

Figure 9:
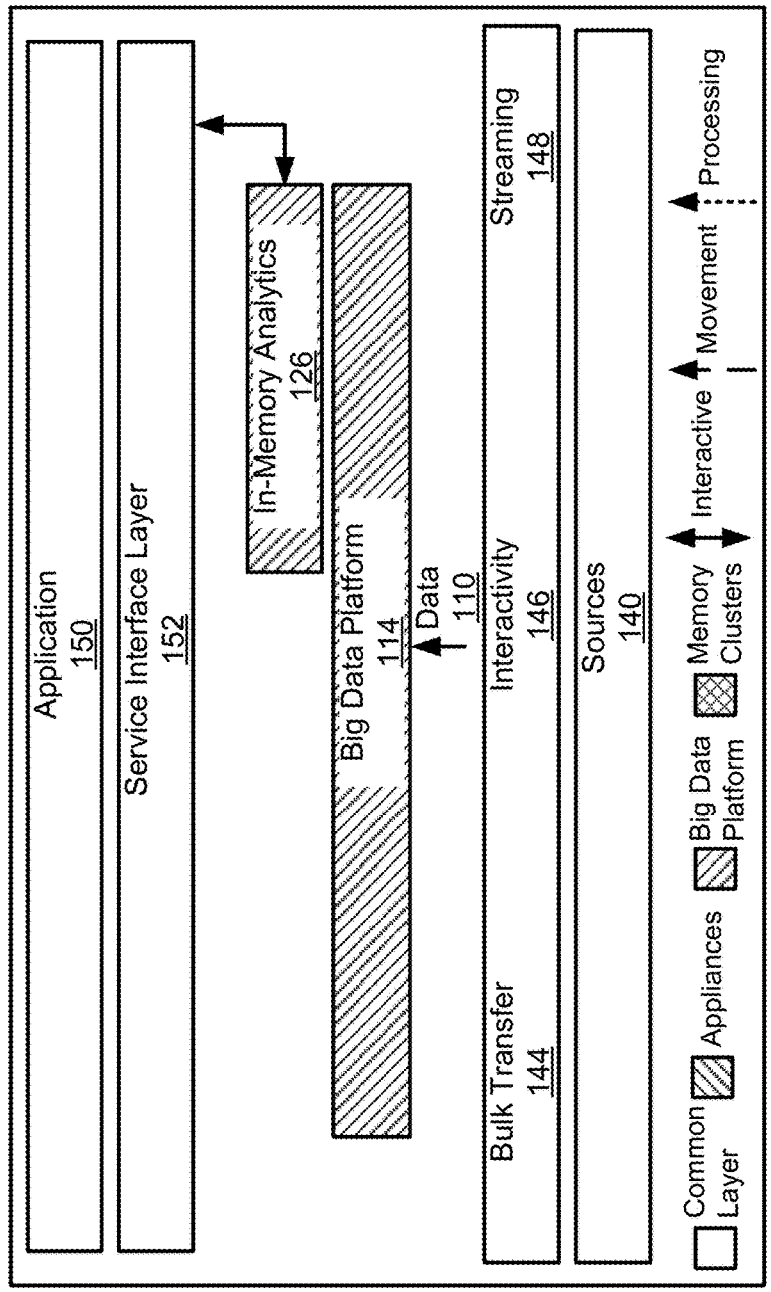
FIG. 9 illustrates a big data platform and in-memory database analytics for the data acceleration apparatus of FIG. 1, according to an example of the present disclosure.

FIG. 9 illustrates a big data platform and in-memory analytics for the apparatus 100, according to an example of the present disclosure.

Referring to FIG. 9, analytical capabilities of the big data platform 114 stem from the ability to leverage the distributed computing power of commodity hardware. As such computing power has strengthened over time, so have the applications that use this hardware. For example, in-memory analytics 126 may be added to the big data platform 114 to improve computations by placing key data in Random Access Memory (RAM) on nodes in a cluster, avoiding aspects of slow disk operations. Referring to Table 1 of FIG. 1C, the configuration of FIG. 9 including the big data platform 114 and the in-memory analytics 126 may correspond to the "BDP—In-Memory Analytics" architectural layout of Table 1, which provides a second (higher) level of capability with respect to data movement, data processing, and data interactivity.

Figure 10:
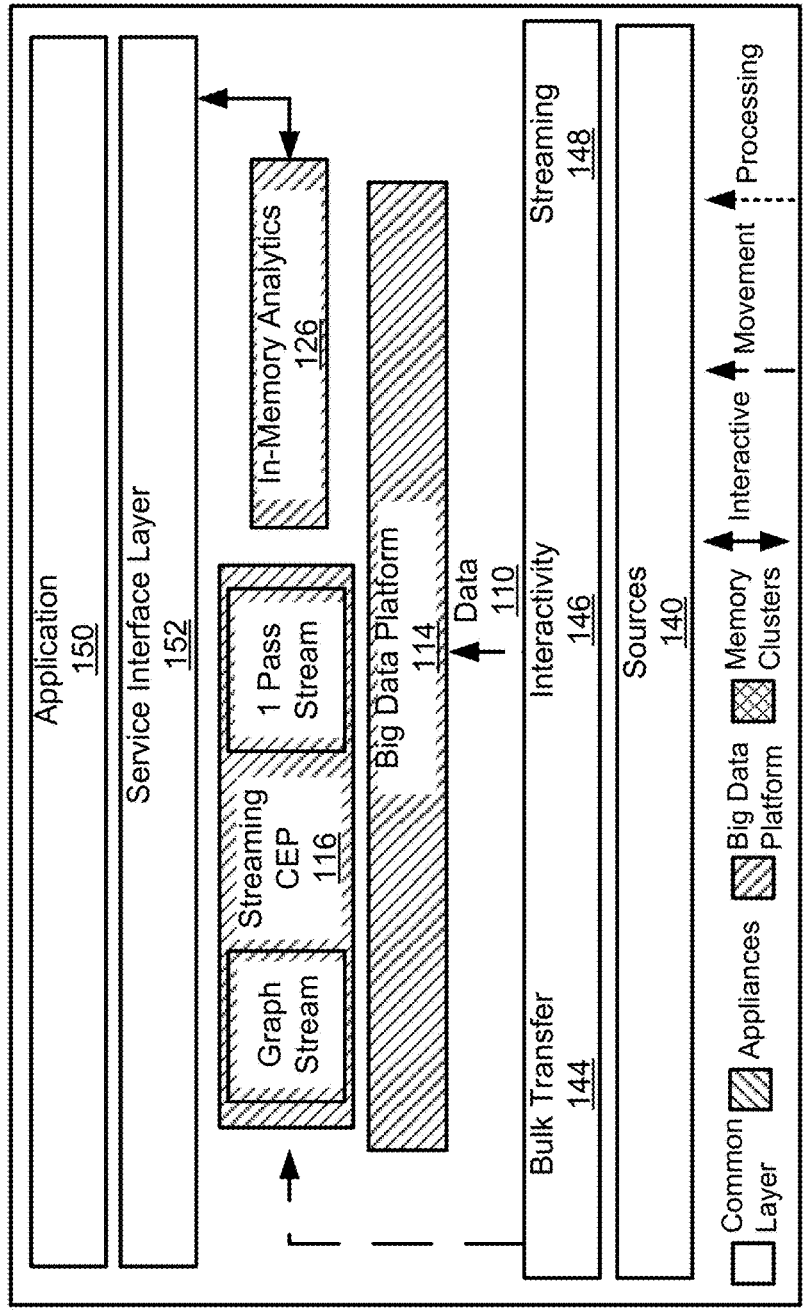
FIG. 10 illustrates a big data platform, CEP, and in-memory database analytics for the data acceleration apparatus of FIG. 1, according to an example of the present disclosure.

FIG. 10 illustrates a big data platform, CEP, and in-memory analytics for the apparatus 100, according to an example of the present disclosure.

Referring to FIG. 10, joining the big data platform 114, the CEP 116, and the in-memory analytics 126 enables faster processing and interactivity compared to the examples of FIGS. 8 and 9. Referring to Table 1 of FIG. 1C, the configuration of FIG. 10 including the big data platform 114, the CEP 116, and the in-memory analytics 126 may correspond to the "Streaming to BDP—In-Memory Analytics" architectural layout of Table 1, which provides a second (higher) level of capability with respect to data movement, data processing, and data interactivity.

Figure 11:
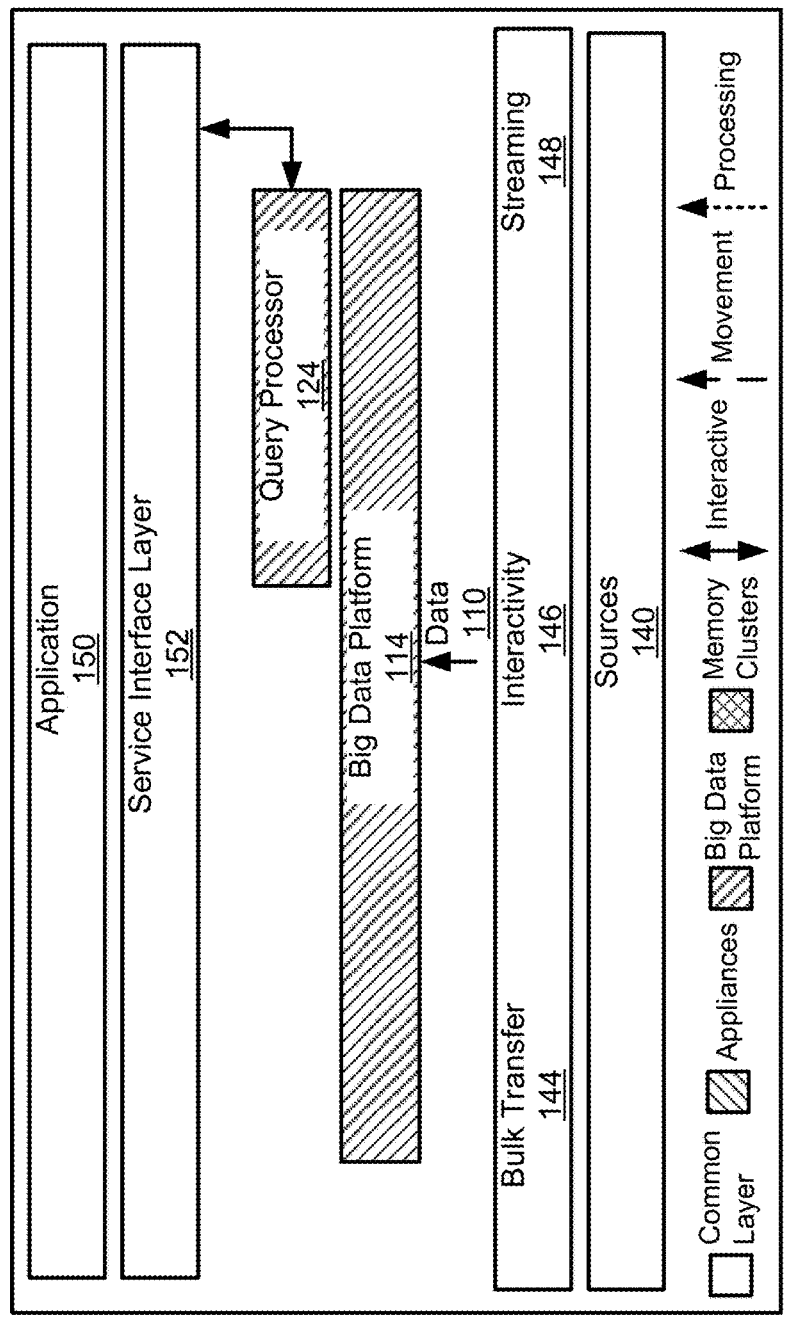
FIG. 11 illustrates a big data platform with a query processor for the data acceleration apparatus of FIG. 1, according to an example of the present disclosure.

FIG. 11 illustrates a big data platform with a query processor for the apparatus 100, according to an example of the present disclosure.

Referring to FIG. 11, adding the query processor 124 to a big data platform 114 opens common interfaces for applications to access data with less delay. A query processor or SQL-on-Hadoop is a class of analytical application tools that combine established SQL-style querying with Hadoop data framework elements to access data stored in HDFS. By supporting familiar SQL queries, SQL-on-Hadoop provides for a wider group of enterprise developers and analysts to work with Hadoop on commodity computing clusters. One technique of achieving this involves creation of a relational database format or schema on top of Hadoop to access the underlying data. Another technique of achieving this includes the use of a plug-in capable engine that enables a SQL language interface to data in different formats (e.g., JSON, Hive™, HBase™, and HDFS) without requiring a formal schema to be described. Thus, big data is more immediately accessible to users and applications who can now query the underlying data using existing interfaces such as SQL. Referring to Table 1 of FIG. 1C, the configuration of FIG. 11 including the query processor 124 and the big data platform 114 may correspond to the "BDP with Query Processor" architectural layout of Table 1, which provides a second (higher) level of capability with respect to data movement and data interactivity, and a first level of capability with respect to data processing.

Figure 12:
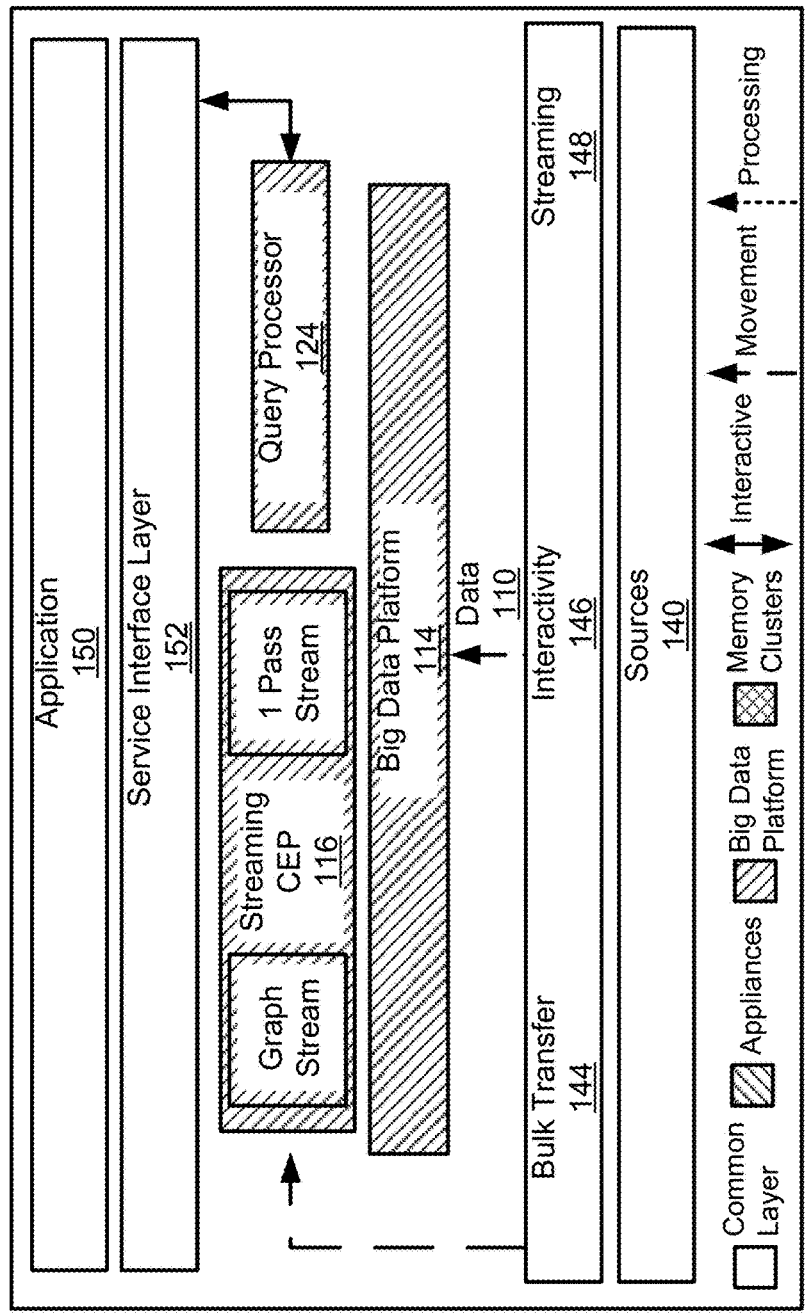
FIG. 12 illustrates a big data platform, CEP, and a query processor for the data acceleration apparatus of FIG. 1, according to an example of the present disclosure.

FIG. 12 illustrates a big data platform, CEP, and a query processor for the apparatus 100, according to an example of the present disclosure.

Referring to FIG. 12, with certain technologies, CEP results can be accessed directly from the query processor 124, fostering improved data movement, processing, and interactivity. Referring to Table 1 of FIG. 1C, the configuration of FIG. 12 including the big data platform 114, the CEP 116, and the query processor 124 may correspond to the "Streaming to BDP—Query Processor" architectural layout of Table 1, which provides a second (higher) level of capability with respect to data movement, data processing, and data interactivity.

Figure 13:
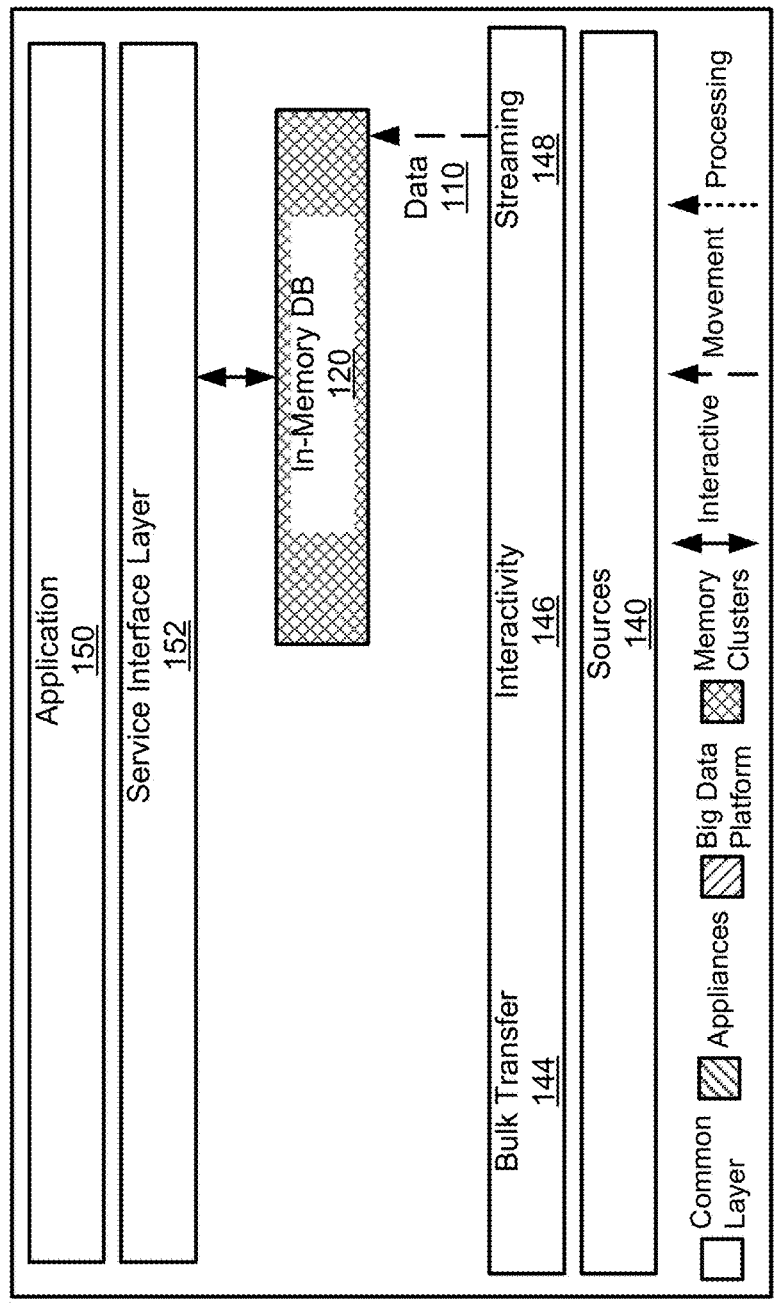
FIG. 13 illustrates an in-memory database cluster for the data acceleration apparatus of FIG. 1, according to an example of the present disclosure.

FIG. 13 illustrates an IMDB cluster for the apparatus 100, according to an example of the present disclosure.

Referring to FIG. 13, in order to facilitate data movement, processing, and interactivity, the data 110 from different external sources may be either streamed-in or bulk transferred directly to the IMDB 120 (which may also be described as an IMDB cluster). The processing includes simple to complex calculations, model executions, and statistical comparisons, all of which take place in-memory within the IMDB 120. Without the need to page information in or out of memory, the IMDB 120 improves read and write performance, thus adding speed to data processing. Users and applications may directly query the IMDB 120 as they would query any other database for specific information. These queries may use SQL-like structures, making the data readily accessible. Additionally, queries may be optimized in-memory. For example, when returning data, computers in the IMDB 120 with the most resources available will be selected to respond. Such optimization provides faster response times. Referring to Table 1 of FIG. 1C, the configuration of FIG. 13 including the IMDB 120 may correspond to the "IMDB only" architectural layout of Table 1, which provides a second (higher) level of capability with respect to data movement and data interactivity, and a first level of capability with respect to data processing.

Figure 14:
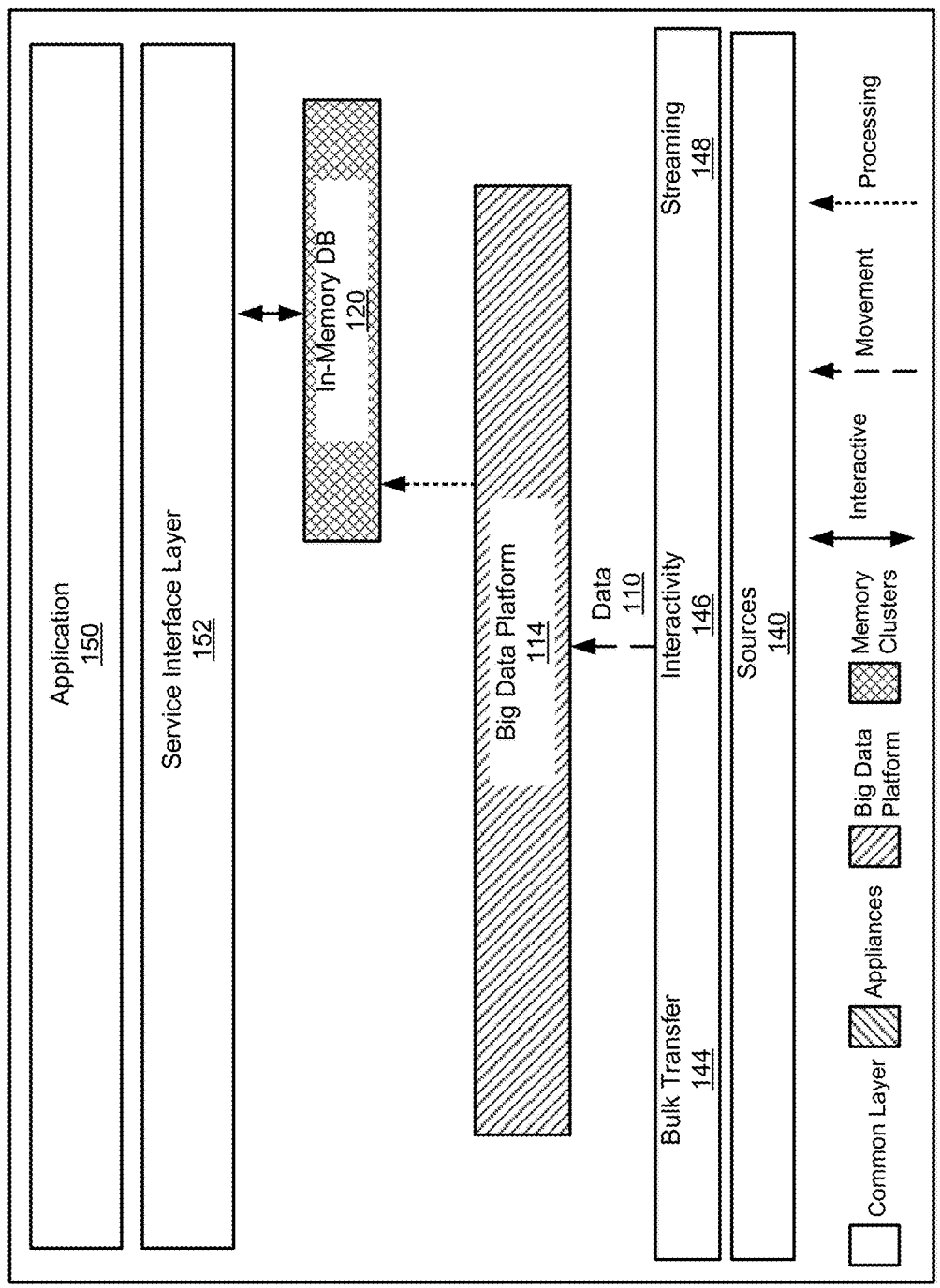
FIG. 14 illustrates an in-memory database cluster with a big data platform for the data acceleration apparatus of FIG. 1, according to an example of the present disclosure.

FIG. 14 illustrates an IMDB cluster with a big data platform for the apparatus 100, according to an example of the present disclosure.

Referring to FIG. 14, the data 110 may be first ingested into the apparatus 100 either by the bulk transfers 144 or by the streaming 148 process through the big data platform 114. The data 110 may be stored on the distributed file system of the big data platform. This approach enables pre-processing to take place on the bid data platform before the data 110 is transferred to the IMDB 120. Such pre-processing speeds up future processing. The IMDB 120 may perform the majority of the analytical processing completely in-memory, delivering faster read and write performance. For the IMDB 120, queries requested by the application 150 may be optimized and executed in the IMDB 120, with results being quickly returned to the application 150. Referring to Table 1 of FIG. 1C, the configuration of FIG. 14 including the IMDB 120 and the big data platform 114 may correspond to the "BDP to IMDB" architectural layout of Table 1, which provides a second (higher) level of capability with respect to data movement and data interactivity, and a first level of capability with respect to data processing.

Figure 15:
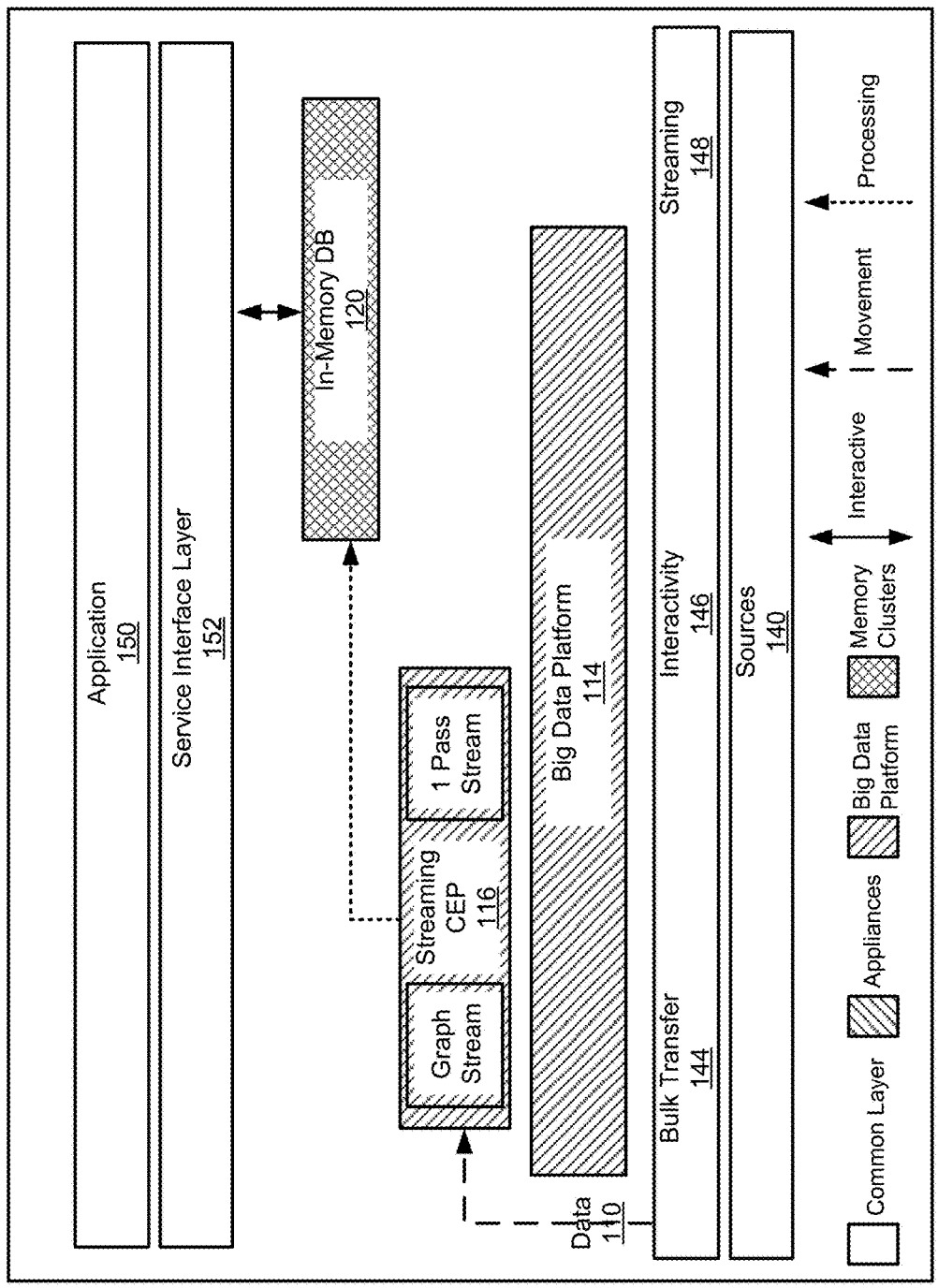
FIG. 15 illustrates an in-memory database cluster, CEP, and a big data platform for the data acceleration apparatus of FIG. 1, according to an example of the present disclosure.

FIG. 15 illustrates an IMDB cluster, CEP, and a big data platform for the apparatus 100, according to an example of the present disclosure.

Referring to FIG. 15, data from sources may be first ingested into the apparatus 100 through the CEP 116. The majority of the analytical processing, including model execution and statistical comparison, may take place in the IMDB 120. Queries requested by the application 150 may be executed in the IMDB 120 and returned to the application 150 for faster interactivity. For the example of FIG. 15, according to an example, the big data platform 114 may be used for storage, the streaming CEP 116 may be used for real-time anomaly detection, and the IMDB 120 may be used for low latency interaction with the results. Referring to Table 1 of FIG. 1C, the configuration of FIG. 15 including the IMDB 120, the CEP 116, and the big data platform 114 may correspond to the "Streaming to IMDB" architectural layout of Table 1, which provides a second (higher) level of capability with respect to data movement, data processing, and data interactivity.

Figure 16:
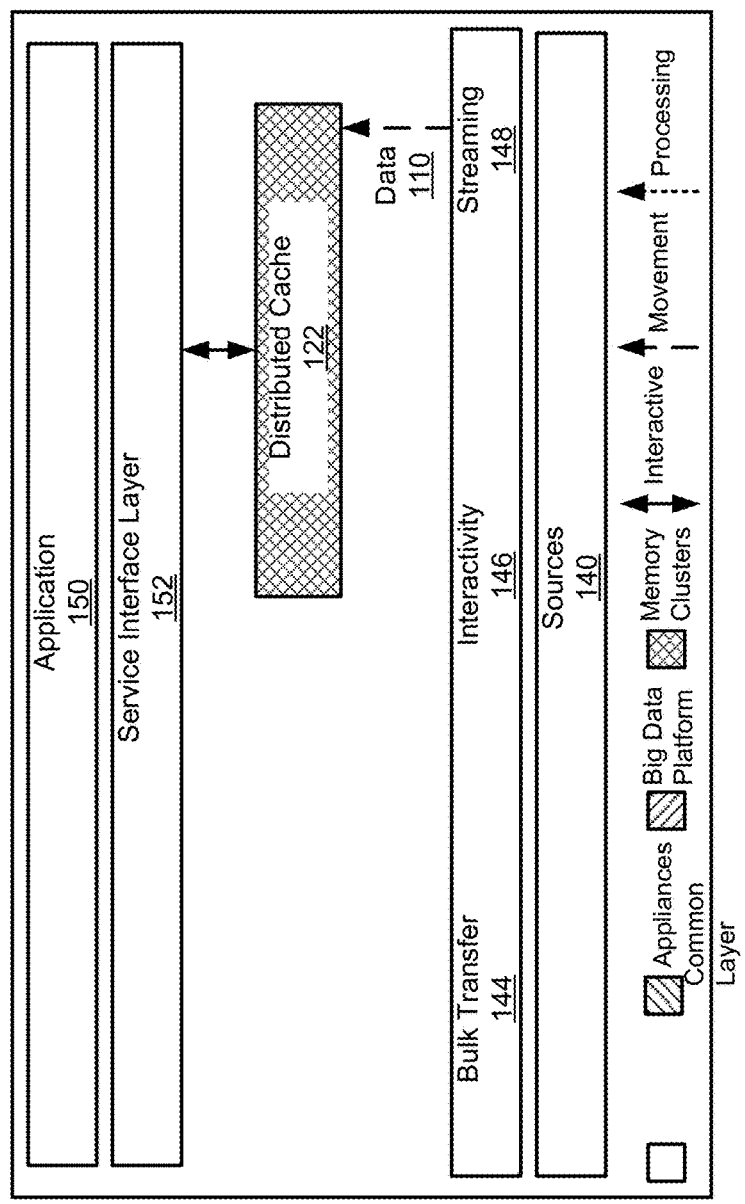
FIG. 16 illustrates a cache for the data acceleration apparatus of FIG. 1, according to an example of the present disclosure.

FIG. 16 illustrates a distributed cache for the apparatus 100, according to an example of the present disclosure.

Referring to FIG. 16, a caching framework may sit atop the data source repository and may be connected to the application 150. The application 150 may retrieve the data 110. In order to optimize query processing time, the distributed cache 122 may be tuned such that data subsets that are most relevant to the application 150 are placed in the distributed cache 122. Since the distributed cache 122 stores the data 110, processing of the data 110 is performed by the application 150. Referring to Table 1 of FIG. 1C, the configuration of FIG. 16 including the distributed cache 122 may correspond to the "Dist. Cache Cluster only" architectural layout of Table 1, which provides a second (higher) level of capability with respect to data movement, and data interactivity, and a first level of capability with respect to data processing.

Figure 17:
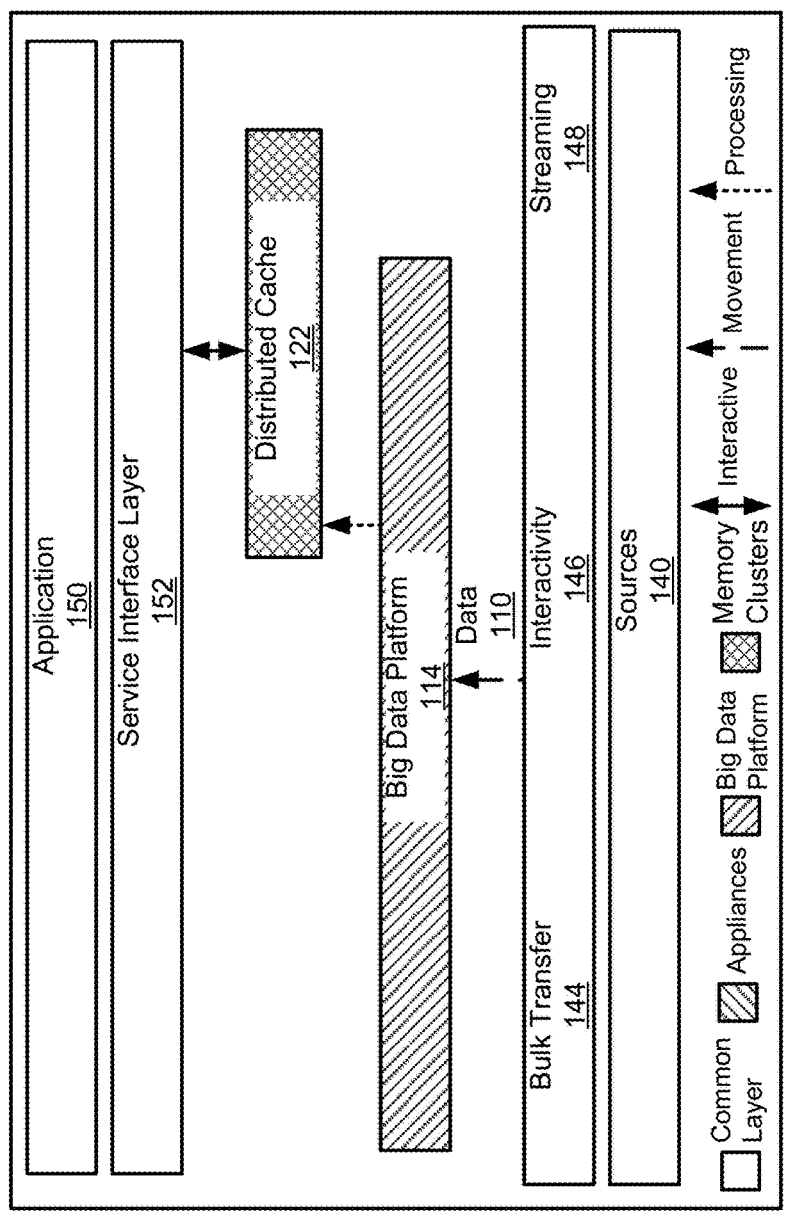
FIG. 17 illustrates a distributed cache, and a big data platform for the data acceleration apparatus of FIG. 1, according to an example of the present disclosure.

FIG. 17 illustrates a distributed cache, and the big data platform for the apparatus 100, according to an example of the present disclosure.

Referring to FIG. 17, the big data platform 114 may ingest the data 110 from the source, and perform the majority of the processing before loading a data subset into the distributed cache 122. This shifts the burden of data processing from the application 150 to the big data platform 114, which may execute complex analytic processes on large datasets more efficiently. The distributed cache 122 may be disposed atop the big data platform 114, which feeds the application's query results. Referring to Table 1 of FIG. 1C, the configuration of FIG. 17 including the distributed cache 122 and the big data platform 114 may correspond to the "BDP to cache cluster" architectural layout of Table 1, which provides a second (higher) level of capability with respect to data movement and data interactivity, and a first level of capability with respect to data processing.

Figure 18:
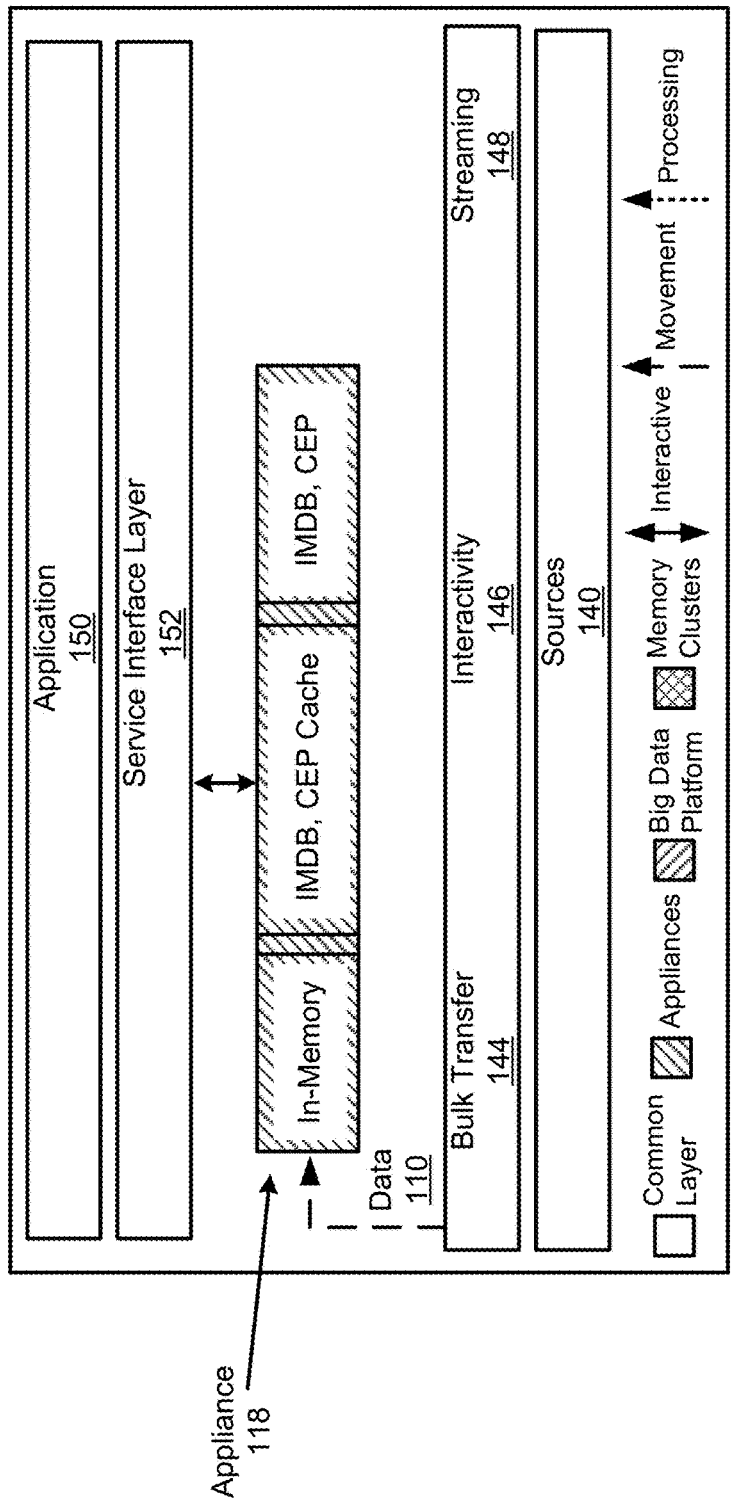
FIG. 18 illustrates an appliance for the data acceleration apparatus of FIG. 1, according to an example of the present disclosure.

FIG. 18 illustrates an appliance for the apparatus 100, according to an example of the present disclosure.

Referring to FIG. 18, data from the sources 140 streams directly into the appliance 118, which completes processing, analytics, and calculations. The application 150 may communicate directly with the appliance 118 for query requests. Referring to Table 1 of FIG. 1C, the configuration of FIG. 18 including the appliance 118 may correspond to the "Appliance only" architectural layout of Table 1, which provides a second (higher) level of capability with respect to data movement, data processing, and data interactivity.

Figure 19:
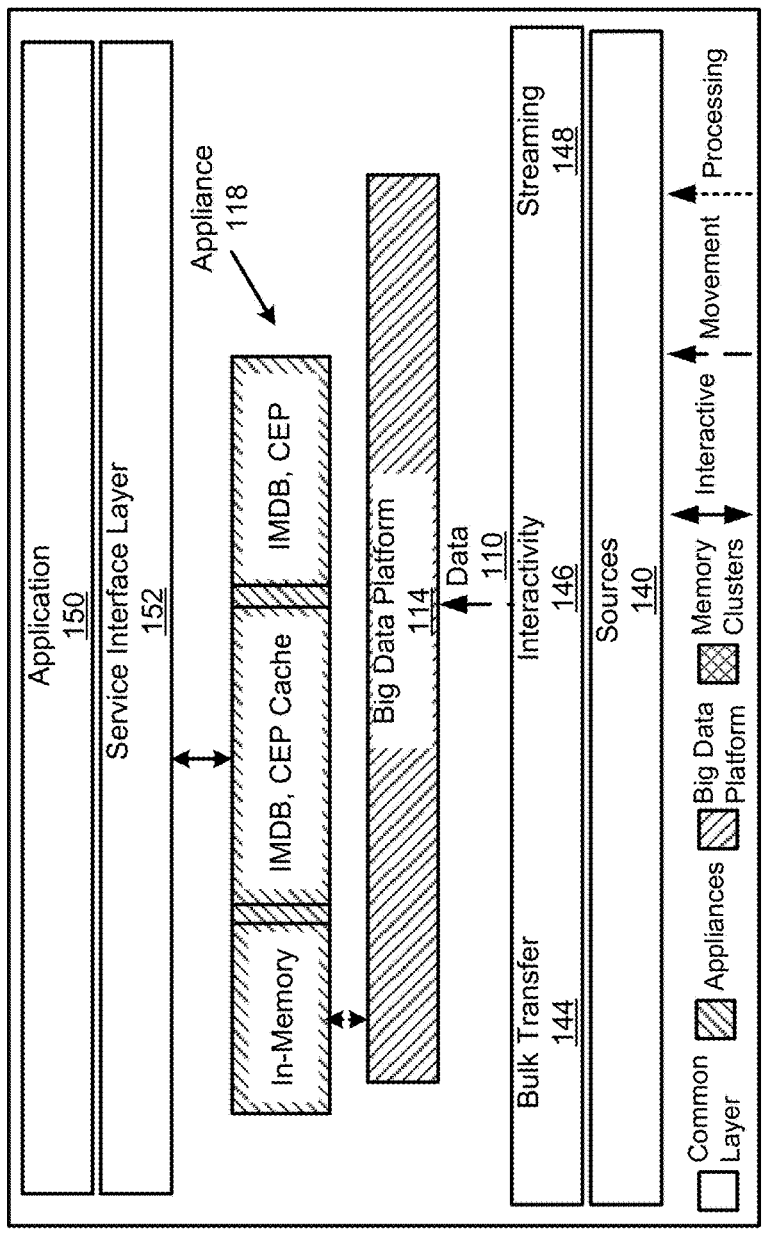
FIG. 19 illustrates an appliance and a big data platform for the data acceleration apparatus of FIG. 1, according to an example of the present disclosure.

FIG. 19 illustrates an appliance and a big data platform for the apparatus 100, according to an example of the present disclosure.

Referring to FIG. 19, the data 110 from the sources 140 may be imported and stored within the big data platform 114. The data 110 may be processed by the big data platform 114 before transfer to the appliance 118 to achieve faster processing speed. The application 150 may also directly communicate with the appliance 118 for query requests. Referring to Table 1 of FIG. 1C, the configuration of FIG. 19 including the appliance 118 and the big data platform 114 may correspond to the "BDP to Appliance" architectural layout of Table 1, which provides a second (higher) level of capability with respect to data movement, data processing, and data interactivity.

Figure 20:
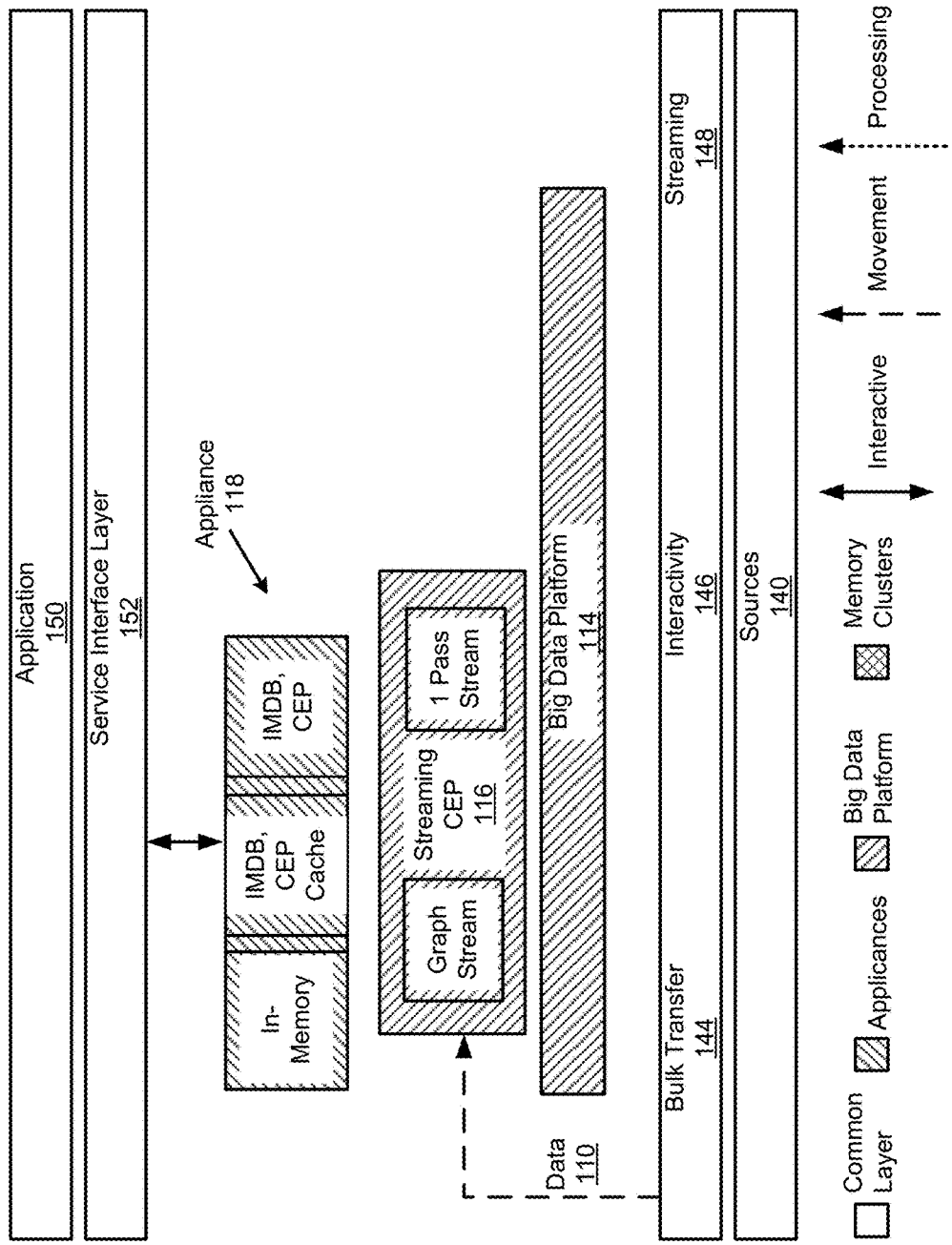
FIG. 20 illustrates an appliance, CEP, and a big data platform for the data acceleration apparatus of FIG. 1, according to an example of the present disclosure.

FIG. 20 illustrates an appliance, CEP, and a big data platform for the apparatus 100, according to an example of the present disclosure.

The data 110 from the sources 140 may be first imported and stored within the big data platform 114 through streaming. The data 110 may be processed inside the big data platform 114 before transfer to the appliance 118 to achieve optimal processing speed. The application 150 may directly query the appliance 118 for information. Referring to Table 1 of FIG. 1C, the configuration of FIG. 20 including the appliance 118, the CEP 116, and the big data platform 114 may correspond to the "Streaming to Appliance" architectural layout of Table 1, which provides a second (higher) level of capability with respect to data movement, data processing, and data interactivity.

Figure 21A:
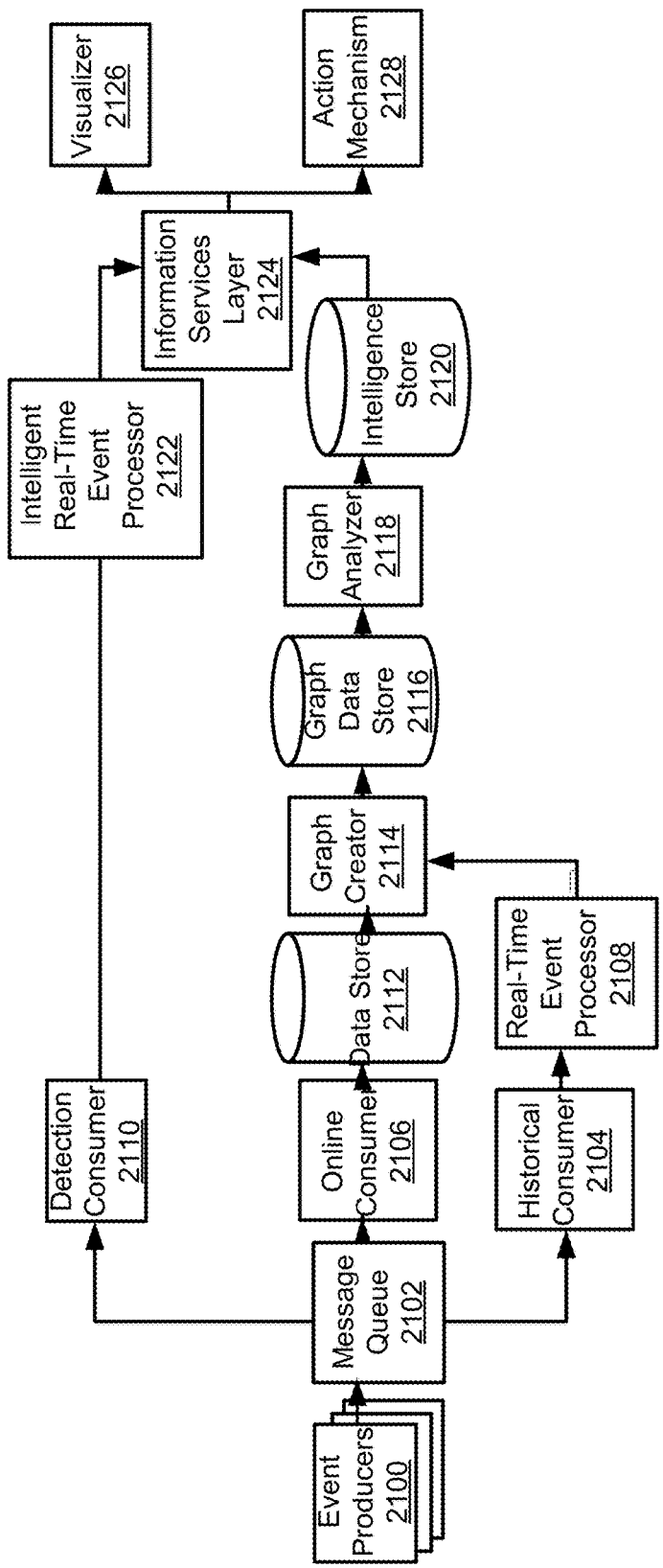
FIG. 21A illustrates a functional diagram related to data acceleration for the data acceleration apparatus of FIG. 1, according to an example of the present disclosure.

FIG. 21A illustrates a functional diagram related to data acceleration for the apparatus 100, according to an example of the present disclosure.

With respect to the functional diagram of FIG. 21A, the apparatus 100 may address aspects related to availability, maintainability, operability performance and scalability, usability, recoverability and reliability, security, and portability.

With respect to availability, the apparatus 100 may provide for the ability to meet requirements for uptime and readiness to users. With respect to maintainability, the apparatus 100 may be evolved in a manner that is cost effective and continues to meet service levels. With respect to operability, the apparatus 100 may support operability in a manner that is cost effective and continues to meet service levels. With respect to performance and scalability, the apparatus 100 may process events with targets specified by a service level agreement (SLA), given the number of concurrent users, and perform within the SLA as the number of events and users increases. With respect to usability, the apparatus 100 may include an effective design of screens, windows, forms, dialogs, graphics, and reports such that a user may utilize the apparatus 100 effectively. With respect to recoverability and reliability, the apparatus 100 may provide for resuming normal operations after outages or failures. With respect to security, the apparatus 100 may provide for the ability to control, manage, and report accesses to the capabilities and the data 110 associated with the apparatus 100, which includes preventing unauthorized usage. With respect to portability, the apparatus 100 may be readily implemented on different hardware or system software platform.

Referring to FIG. 21A, for the apparatus 100, event producers 2100 may produce raw information events for consumption. A message queue 2102 may collect and organize events which are pulled by downstream subscribers. A historical consumer (downstream subscriber) 2104 may pull events from the message queue and store the events into a data store. An online consumer (downstream subscriber) 2106 may pull events from the message queue, and pass the events into a real-time event processor 2108. The real-time event processor 2108 may represent the CEP 116 of FIG. 1B. The real-time event processor 2108 may evaluate events based on programmed or dynamic rules/algorithms to identify key information. A detection consumer 2110 may pull events from key fields from the message queue 2102 for further examination by the real-time event processor 2108. A data store 2112 may hold all events from the message queue and process analysis across all information in batch using machine learning and deep learning algorithms. A graph creator 2114 may read, combine, and organize data from the data store 2112 and the real-time event processor 2108. Further, the graph creator 2114 may write the results to a graph data store 2116. The graph data store 2116 may hold the analyzed data in an optimized format for event correlation based queries. A graph analyzer 2118 may pull information from the graph data store 2116. The graph analyzer 2118 may analyze the information based on policies and rules, as well as influences from machine learning and deep learning results. Further, the graph analyzer 2118 may store the results in an intelligence store 2120. The intelligence store 2120 may hold the results from the analyzed graph stored event analytics. An intelligent real-time event processor 2122 may evaluate events based on intelligence information derived from historical, real-time, and graph based intelligence analytical results. An information services layer 2124 may provide a programmatically or manually accessible data interface based on information read/query techniques (e.g., application programming interface (API)). A visualizer 2126 may provide for visual representation of resulting intelligence information in human understandable format. An action mechanism 2128 may represent a software program that supports action (e.g., automated or manual) based on the intelligent result from the data.

Figure 21B:
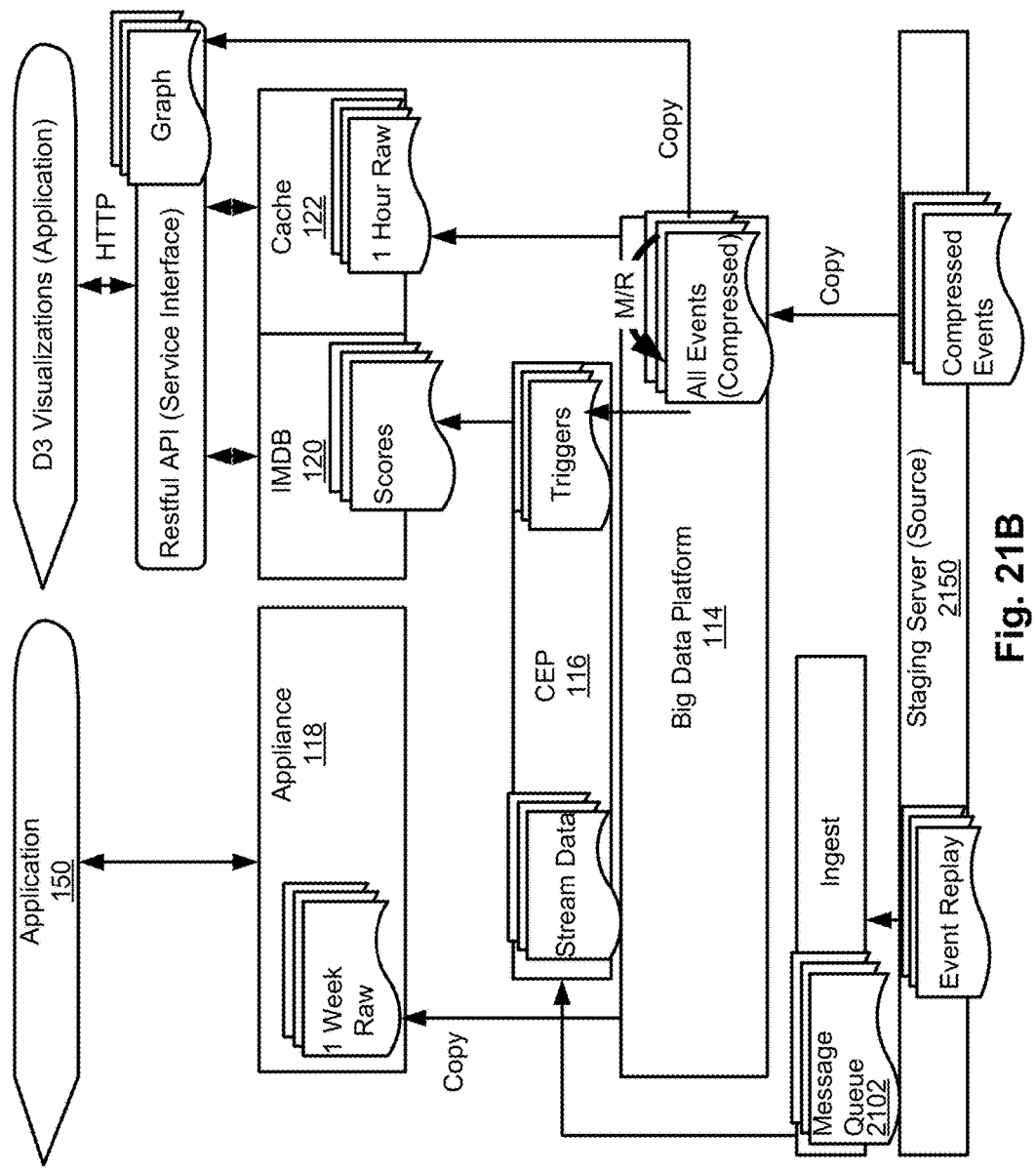
FIG. 21B illustrates a logical architecture for event anomaly analysis and prediction for the functional diagram of FIG. 21A and the data acceleration apparatus of FIG. 1, according to an example of the present disclosure.

FIG. 21B illustrates a logical architecture for event anomaly analysis and prediction for the functional diagram of FIG. 21A and the apparatus 100, according to an example of the present disclosure.

Referring to FIGS. 1A, 1B, 21A, and 21B, with respect to real-time processing of a data stream, the message queue 2102, the real-time event processor 2108, and the IMDB 120 may be used. A Java™ script may create a simulated stream from log files, for example, from a staging server 2150 (corresponding to the sources 140). Each event trace from an input source may be ingested into the message queue 2102 on a specific topic. The message queue 2102 may be consumed, and rapid filtering, correlation, aggregation and detection of patterns across multiple streams of real-time data may be performed by the CEP 116. When an anomalous event is encountered, the anomalous event may be flagged and stored in the IMDB 120. For example, when an event is encountered by the CEP 116, the CEP 116 compares the event with the logic encoded in the CEP 116 to determine if there is a pattern match (i.e., if the incoming event matches the pattern of an anomalous event (as identified earlier from the historical, real-time, and graph based intelligence analytical results)). In response to a determination that there is a pattern match, the event is flagged as an anomalous event and stored in the IMBD 120.

Figure 21C:
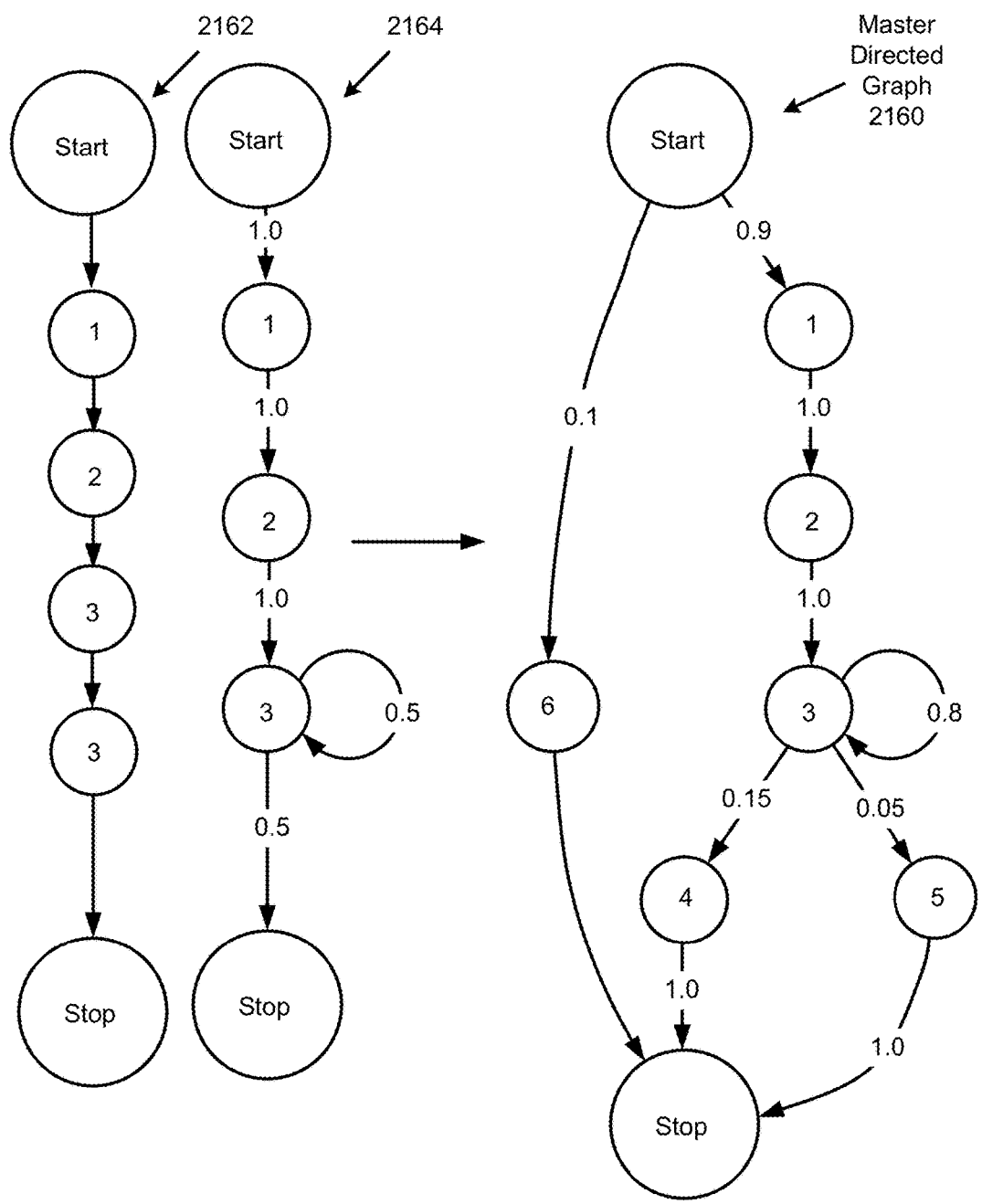
FIG. 21C illustrates a master directed graph with labels, weights, and start-stop nodes for event anomaly analysis and prediction, according to an example of the present disclosure.

FIG. 21C illustrates an example of a master directed graph 2160 (i.e., a directed cyclic graph (DCG)) from a mined input log file where each of the nodes corresponds to an event within the log with overlapping identifier features. The master directed graph 2160 may be used for real-time event anomaly analysis and prediction with the data acceleration architectural layout 108. For the master directed graph 2160, an example of a trace entry may include "114.135.67.66,,,, 583064f457f9de54307835f738ab09c671e596dd5db6b-40b0d3a9 e102e256bee,3ZUB5Zj8BABCAA7H4FDTC+Q==,,,20 Feb. 2014 22:59:09 EST,Low,US/Eastern,-18000000,,,,,,,,superagent_ng,5.2.5.6403.0,,,". The graphs 2162, and 2164 represent trace graphs that are used to generate the master directed graph 2160. The master directed graph 2160 includes labels, weights, and start-stop nodes for the apparatus 100. It should be noted that although FIG. 21C depicts an example of a master directed graph with edge transition likelihoods, in reality, a master directed graph may include many nodes with thousands of inter connecting transition links. Timestamps determine the direction of the arcs and probability of transitions between events. Arbitrary start-stop nodes may be placed in the master directed graph to depict predominate starting points of mined trace sequences.

Once a series of trace sequences have been mined and an aggregate model created, analytics and filtering may be performed. The data anomaly analyzer 130 may be executed in a precedence ordered pipeline process with each plug-in receiving the output of the last. The framework may have any number of filtering plug-ins with each receiving the same data from the last pipelined analytics algorithm as the other, and returning either a true or false according to whether each event or edge from a mined model passes inspection. As each event or edge is filtered, information regarding the reason for returning a passing grade of true is stored and may be retrieved for later querying from a mined model.

The data anomaly analyzer 130 may ingest a portion of a file or subset of a group of files (i.e., from the data 110), and learn a graph for that portion of the trace entries. As each mapper completes its task, its graph is merged with other graphs through a series of reducers to create a final master graph representative of all behaviors for a given slice of time.

With respect to anomaly extraction and ranking, once the data anomaly analyzer 130 learns a series of network agent behaviors as a graph model, then the anomalies within a network may be discovered.

According to an example of real-time event anomaly analysis and prediction with the data acceleration architectural layout 108, the master directed graph 2160 with likelihood transition information may be considered similar to a web graph with documents. Thus, a ranking process may be applied over the master directed graph 2160 to discover the importance of any given event node with respect to others. An example of a ranking process may include a PageRank™ process.

PageRank may be described as a technique to rank a node with respect to other nodes in the master directed graph 2160. PageRank is a way of measuring the importance of nodes. PageRank operates by counting the number and quality of links to a node to determine a rough estimate of how important the node is. The underlying assumption is that more important nodes are likely to receive more links from other nodes. For example, PageRank assigns a numerical weighting to each node of the master directed graph 2160, with the purpose of measuring each node's relative importance within the master directed graph 2160. The numerical weight that is assigned by PageRank to any given node N may be referred to as the PageRank of node N and denoted by PR(N).

Opposite to the goals of search engines, which seek to return the set of most relevant nodes or documents in the graph, the least relevant node events and hence the most anomalous in this context may be identified for the master directed graph 2160. A set of probability values may be used as the basis for automatically creating rules that contain the degree of anomalousness of streaming network event data. Each rule may be composed of several parts, where the first part is the event (including the event source), the first number is the anomaly category (Very High, High, Medium, Low, Very Low) expressed, for example, as a value from 0 to 4, and the second number is the probability of anomalousness of the event. Five examples of rules include the following:

1. 'CISCO::Deny HOPOPT reverse path check', 0, 0.00084952537103525564.
2. 'Juniper::User Client Server Session Change', 0, 0.00084952537103525564.
3. 'CISCO::end configuration', 0, 0.00084952537103525564.
4. 'NetScreen::Vsys admin user logged on via Telnet from remote IP address using port', 0, 0.00084952537103525564.
5. 'NetScreen::SSH: Password authentication failed for admin user', 0, 0.00084956880197824822.

For example, the rule "'CISCO::Deny HOPOPT reverse path check', 0, 0.00084952537103525564" indicates that if the incoming event 'CISCO::Deny HOPOPT reverse path check' matches a known event in a rules watch list, the incoming event is categorized (e.g., on a scale of 0-4) according to how the event has been classified. For this example, the incoming event 'CISCO::Deny HOPOPT reverse path check' is classified as "0", which represents a "Very High" anomaly category. If an event is highly anomalous (as well as for all anomaly categories), then the rule may include an associated action. For example, for the rule "'CISCO::Deny HOPOPT reverse path check', 0, 0.00084952537103525564", the associated action may include deny or quarantine the source (e.g., CISCO), etc.

Once anomaly probability values are calculated for every event node in a graph model, a clustering technique such as k-means clustering with a randomly seeded centroid and a defined centroid displacement value indicating stability may be used to rank the values into five distinct anomaly categories 110 as follows: very-high, high, medium, low, and very-low may be applied. A cluster may represent a group of events.

Anomalousness scores for all events within a given model may be extracted and categorized. For example, k-means clustering may be used on the ranked anomalousness values to produce distinct anomaly categories based on ranking scores from high anomalousness to low anomalousness with a randomly seeded centroid and a defined centroid displacement value indicating stability. These categorizations may be fed into the real-time CEP 116 to generate rules to grade new events for a given time of a day to aid analysts and help provide context to risk assessments. For example, as disclosed herein with respect to the incoming event 'CISCO::Deny HOPOPT reverse path check', the categorization of the associated known event from the master directed graph may be fed into the real-time CEP 116 to generate the rule "'CISCO::Deny HOPOPT reverse path check', 0, 0.00084952537103525564" to grade the incoming event 'CISCO::Deny HOPOPT reverse path check' for a given time of a day to aid analysts and help provide context to risk assessments.

In addition to mining, analytics may be performed on learned graphs to extract anomalous behaviors. Analytics may be applied to discover, detect, and provide guidance on enforcement of how anomalous a given event is with respect to others in two ways. First, analytics may be applied by analyzing learned behavioral graphs and extracting anomalous rankings of events with respect to other preceding events. Second, analytics may be applied by analyzing sequences of behaviors and discovering how much an emerging set of actions differ from known behavior patterns.

Anomalous behaviors may have a probability associated therewith. In this regard, the anomalous behaviors may be ranked into five buckets/categories according to their probability (very-high, high, medium, low, and very-low). The five categories, along with the probability values, may serve to provide intuitive metrics. The discovered anomalies may be used for creation of a set of rules over which the data anomaly analyzer 130 will grade the data 110 that includes a stream of causally tagged event traces. This may serve to narrow the scope of further information processed, and provide a high level view of activities occurring across a system or network, and thus provide a view of the defense in depth or health of an ecosystem.

With respect to the classification of event probabilities into the five categories of very low probability, low probability, medium probability, high probability, and very high probability of occurrence, the event probabilities may be inverted and mapped to the corresponding anomaly category (e.g., a very low probability of occurrence for a particular event correlates to that event being very highly anomalous), resulting in the five anomaly categories of: very high, high, medium, low, and very low.

Analyzing sets of behaviors as a whole and comparing to the patterns that exist within a larger graph allow for the discovery of the persistent threats that are difficult to detect, and for discovering attack categories that take place.

Figure 21D:
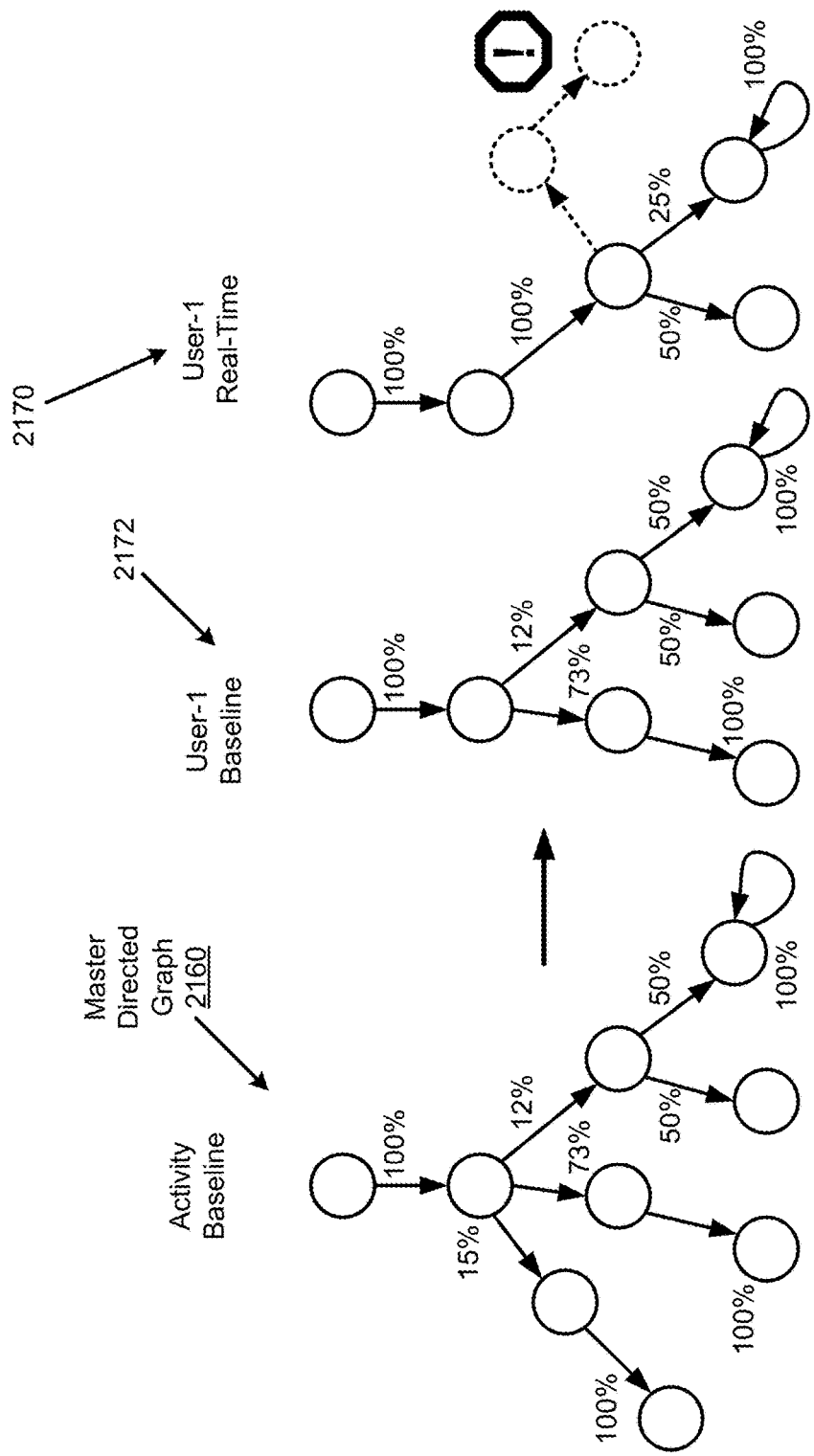
FIG. 21D illustrates anomalous behavior identification based on activity baselines for event anomaly analysis and prediction, according to an example of the present disclosure.

FIG. 21D illustrates anomalous behavior identification based on activity baselines for the apparatus 100, according to an example of the present disclosure.

Referring to FIGS. 1A, 1B, and 21A-21D, when attempting to discover activities, the data anomaly analyzer 130 may compare graph patterns to one another. For example, for sets of agent behaviors that deviate from the norm or sets of activities that closely mimic known behaviors, the data anomaly analyzer 130 may grade how close an event set converges or diverges from known information. The data anomaly analyzer 130 may perform this analysis by measuring graph similarity within the context of anomaly detection for behaviors that a framework mines from tagged trace entries. In this regard, the data anomaly analyzer 130 may categorize how a graph representing a set of events differs from the master directed graph 2160 that represents known or pre-established events. For example, as shown in FIG. 21D, the data anomaly analyzer 130 may categorize how a real-time activity graph for a user-1 at 2170 differs from a user-1 baseline at 2172, which is determined from the master directed graph 2160 that represents known or pre-established events. For example, the "dashed" lines for the real-time activity graph for a user-1 at 2170 represent anomalies with respect to the master directed graph 2160. In this regard, based on a set of rules, an event such as the "dashed" lines for the real-time activity graph for the user-1 at 2170 may have been characterized as a very-high anomalous event (since no corresponding event such as the "dashed" lines exists in the user-1 baseline at 2172 or in the master directed graph 2160). In this regard, any event that is not present in the user-1 baseline at 2172 or in the master directed graph 2160 may have been categorized as highly anomalous. Alternatively, assuming that the master directed graph 2160 includes an anomalous categorized event (not shown in FIG. 21D) such as the event including the "dashed" lines, based on a match of the event including the "dashed" lines with the corresponding anomalous categorized event from the master directed graph 2160, the event including the "dashed" lines may be categorized accordingly. That is, the data anomaly analyzer 130 may determine a bounded metric to characterize the degree of contextual fitness or anomalousness of an incoming walk of trace events or graph (e.g., the real-time activity graph for the user-1 at 2170) compared to that of another walk or graph (e.g., the user-1 baseline at 2172).

Thus, the data anomaly analyzer 130 may grade an incoming or emerging (in-flight) sequence of events against the probabilistic rankings of all known event walks that are contained within the master directed graph 2160. The computation of the metric may be based on the graph structure, with the results yielding a probabilistic insight on graph similarity. For the example of FIG. 21D, the data anomaly analyzer 130 may determine whether the real-time activity graph for the user-1 at 2170 is converging to the user-1 baseline at 2172, or diverging, as well as provide an intuitive metric scaled between 0 and 1. That is, the following metrics may be given for patterns compared to that of learned patterns: intersection, fitness, type (converging or diverging patterns), and significance of matching. This detection methodology may combine forensic information as well as streaming information to detect interesting patterns consisting of sequences of events. Thus, the streaming detection measures anomalousness of an incoming, potentially incomplete, in-flight walk of events compared against the probability density distribution of all known master walks from the master directed graph 2160 or learned model of behavior (e.g., the real-time activity graph for the user-1 at 2170).

With respect to detection and enforcement, the apparatus 100 may implement a tiered approach where the first approach is to determine if an incoming event is anomalous with respect to all learned behaviors for a given model at a given time for a given granularity. Any incoming trace (i.e., from the data 110) deemed to be anomalous may then be tagged for further analysis and associated with all relevant information (e.g., agent originator, time, etc.). A second tier may then perform further analysis on a sequence of events to determine if an anomalous pattern or walk may be detected with respect to the probability distribution of all master walks within a known master graph model as disclosed herein with respect to FIG. 21D.

The support of an event management system will be comprised of, at a minimum, a collection system that has a message queue. Additionally the underlying architecture may support relatively large storage for batch mode learning, and CEP systems for real-time learning. A system or set of systems may be needed to accept incoming data connections from multiple sources. In this regard, detection and enforcement may rely on the architecture of the apparatus 100 to provide the framework for these integration requirements to ensure proper execution.

With respect to online-learning, for real-time learning, a CEP solution environment over which analytics may be performed may be implemented. As trace events are tagged and ingested, for example, by CEP, a model representing agent behaviors may be learned in real-time. As information is casually tagged with agent information and other metadata, statistical learning techniques may be applied to understand the importance of new trace events and their place within the larger model of given granularity. Online learning may produce a representative model of the relationships of trace events that have occurred. All data handled for real-time analysis and learning may be handled (queued, tagged, enriched, etc.) inside the CEP 116, and the data may be exported from the CEP 116 to perform subsequent tasks.

With respect to visualization, a goal of visualization may include making the data 110 accessible to downstream applications by enabling users and applications to connect to the data infrastructure in universally acceptable ways and by ensuring that query results are delivered as quickly as required. To further enhance usability, the anomaly visualizer 136 may generate various types of visualizations 138 to facilitate an identification of anomalies in the data 110. The anomaly visualizer 136 may provide for an understanding of the underlying graph that models behaviors and provides true exploration and interaction through full text search and drill down capabilities. Models may be visually enhanced to have events both highlighted, for example, with color according to how anomalous with respect to previously traversed events, as well as sized according to how probable the particular events are with respect to all events.

Figure 21E:
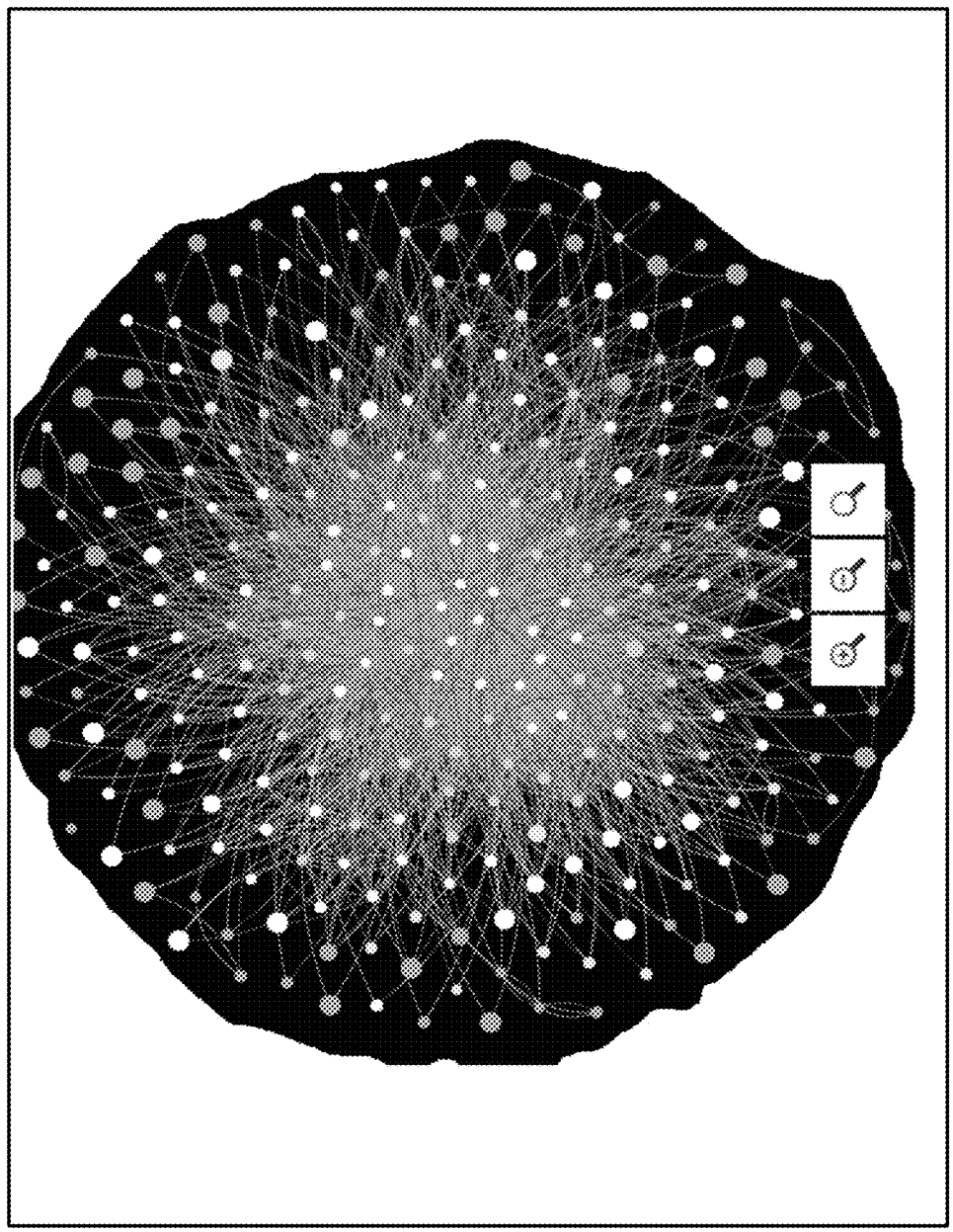
FIG. 21E illustrates a visualized graph model with events coded according to anomalousness of the events, and sized according to their global probabilities for event anomaly analysis and prediction, according to an example of the present disclosure.

For example, FIG. 21E illustrates a visualized graph model with events coded (e.g., color coded) according to how anomalous they are, and sized according to their global probabilities for the apparatus 100, according to an example of the present disclosure.

Referring to FIG. 21E, with respect to an example of network security events, the apparatus 100 may be applied to three months (e.g., three petabyte) of security data to generate graphs with nodes representing the events, edges connecting events that are related to each other, the size representing the anomalousness (i.e., the very high probability of anomalousness events being displayed on the outer bounds as shown in FIG. 21E, to the very-low probability of anomalousness events being displayed towards the middle), and different colors (e.g., red, yellow, orange, etc.) representing the probability of occurrence of the events. Further analysis may be performed by grouping events and providing mechanisms to navigate and visualize them according to their features.

Thus, the output of graph analysis may provide input into dashboards and exploratory visualizations. For example, ranked event anomalies may be stored and streaming events may also be compared against a stored set of the anomaly rankings. Any streamed event that falls within the highest anomaly category may be marked, aggregated, and cumulative event information may be streamed to the in-memory database 120 from which polling will occur at a constant rate to update the visualization for quick display.

Figure 23:
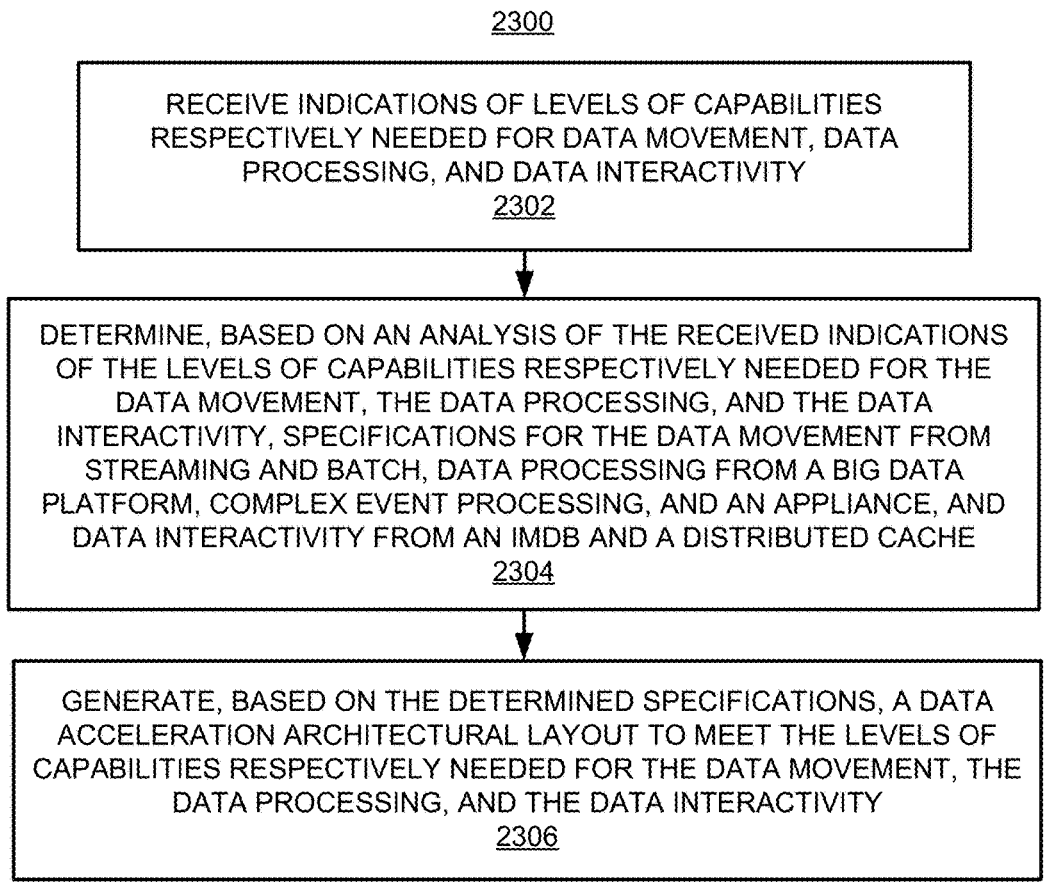
FIG. 23 illustrates a flowchart of another method for data acceleration, according to an example of the present disclosure.
Figure 24:
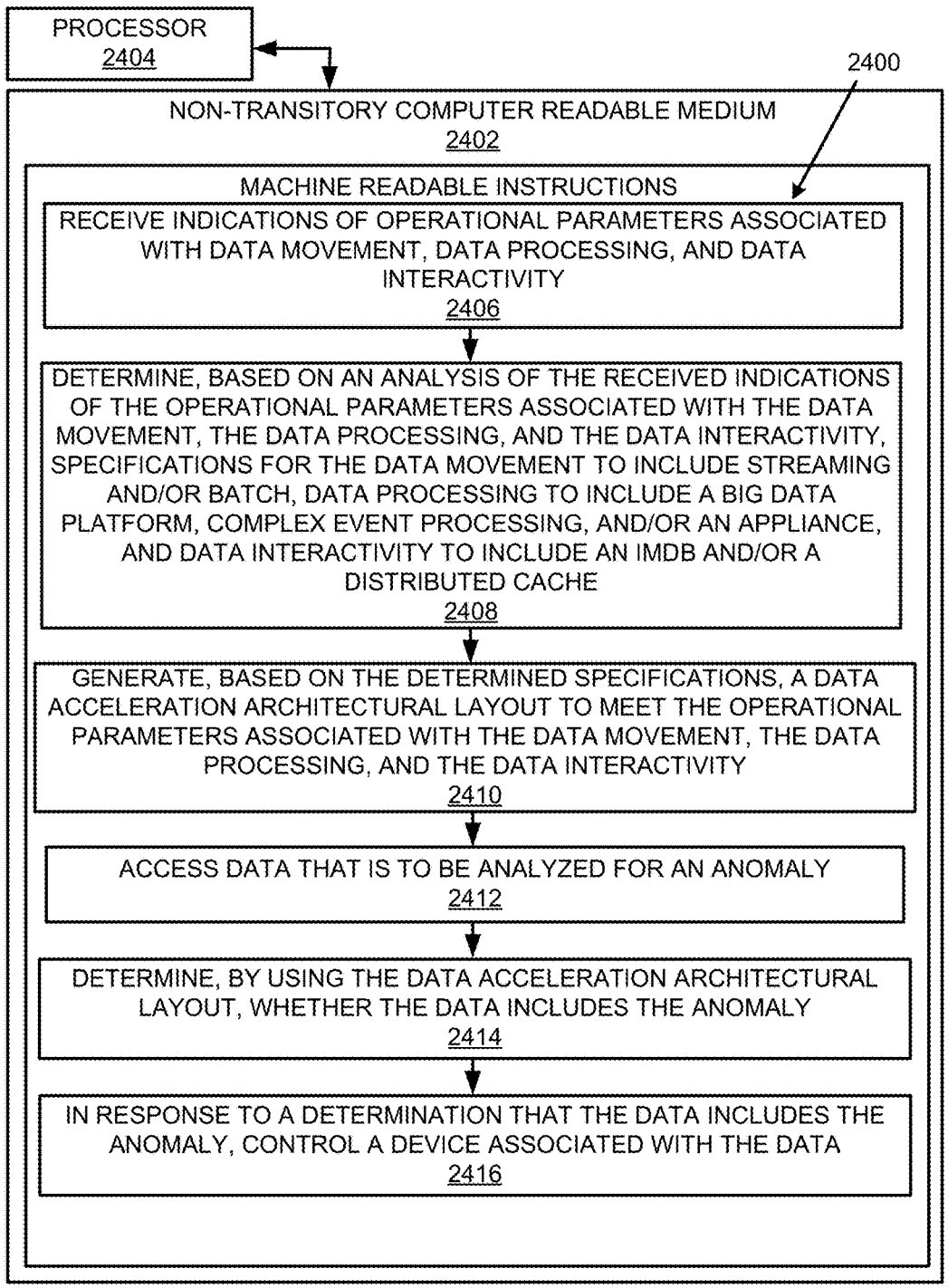
FIG. 24 illustrates a flowchart of a further method for data acceleration according to an example of the present disclosure.

FIGS. 22-24 respectively illustrate flowcharts of methods 2200, 2300, and 2400 for data acceleration, according to examples. The methods 2200, 2300, and 2400 may be implemented on the apparatus 100 described above with reference to FIGS. 1A-21E by way of example and not limitation. The methods 2200, 2300, and 2400 may be practiced in other apparatus. In addition to showing the method 2200, FIG. 22 shows hardware of the apparatus 100 that may execute the method 2200. The hardware may include a processor 2202, and a memory 2204 storing machine readable instructions that when executed by the processor cause the processor to perform the steps of the method 2200. The memory 2204 may represent a non-transitory computer readable medium. FIG. 23 may represent a method for data acceleration, and the steps of the method. FIG. 24 may represent a non-transitory computer readable medium 2402 having stored thereon machine readable instructions to provide data acceleration. The machine readable instructions, when executed, cause a processor 2404 to perform steps of the method 2400 also shown in FIG. 24.

The processor 2202 of FIG. 22 and/or the processor 2404 of FIG. 24 may include a single or multiple processors or other hardware processing circuit, to execute the methods, functions and other processes described herein. These methods, functions and other processes may be embodied as machine readable instructions stored on a computer readable medium, which may be non-transitory (e.g., the memory 2204 of FIG. 22, and the non-transitory computer readable medium 2402 of FIG. 24), such as hardware storage devices (e.g., RAM (random access memory), ROM (read only memory), EPROM (erasable, programmable ROM), EEPROM (electrically erasable, programmable ROM), hard drives, and flash memory). The memory 2204 may include a RAM, where the machine readable instructions and data for the processor 2202 may reside during runtime.

Referring to FIGS. 1-22, and particularly to the method 2200 shown in FIG. 22, at block 2206, the method 2200 may include receiving (e.g., by the capability level and operational parameter receiver 102) indications of levels of capabilities (i.e., the capability level indications 104) respectively needed for data movement, data processing, and data interactivity, and/or operational parameters 106 associated with the data movement, the data processing, and the data interactivity.

At block 2208, the method 2200 may include determining (e.g., by the data movement, processing, and interactivity determiner 112), based on an analysis of the received indications of the levels of capabilities respectively needed for the data movement, the data processing, and the data interactivity, and/or the operational parameters associated with the data movement, the data processing, and the data interactivity, specifications for the data movement to include streaming and/or batch, data processing to include the big data platform 114, complex event processing, and/or an appliance 118, and data interactivity to include the IMDB 120 and/or the distributed cache 122.

At block 2210, the method 2200 may include generating (e.g., by the data acceleration architectural layout generator 128), based on the determined specifications, the data acceleration architectural layout 108 to meet the levels of capabilities respectively needed for the data movement, the data processing, and the data interactivity, and/or the operational parameters associated with the data movement, the data processing, and the data interactivity.

According to examples, for the method 2200, the data movement may include transport of the data 110 from a first location to a second location by using the data acceleration architectural layout 108.

According to examples, for the method 2200, the data processing may include extraction of actionable insights from the data 110, and implementation of computer clusters to increase a processing rate of the data 110.

According to examples, for the method 2200, the data interactivity may include analyzing the data 110 by using the IMDB 120 and/or the distributed cache 122.

According to examples, for the method 2200, the big data platform 114 may include a big data core including a distributed data storage.

According to examples, for the method 2200, the CEP 116 may include tracking and processing streams of event data from multiple sources to infer and identify patterns in the event data.

According to examples, for the method 2200, the IMDB 120 may include database management that uses the memory for data storage.

According to examples, for the method 2200, the distributed cache 122 may include cache clusters that are maintained in the memory to provide access to frequently accessed data.

According to examples, for the method 2200, the appliance 118 may include a prepackaged unit of hardware, and software, where the hardware includes a server, the memory, a storage, and/or input/output channels, where the software includes an operating system, a database management system, and/or an administrative management software, and where the hardware includes customized silicon.

According to examples, for the method 2200, generating, based on the determined specifications, the data acceleration architectural layout 108 to meet the levels of capabilities respectively needed for the data movement, the data processing, and the data interactivity, and/or the operational parameters associated with the data movement, the data processing, and the data interactivity may further include generating, based on the determined specifications, the data acceleration architectural layout from fourteen architectural layouts to meet the levels of capabilities respectively needed for the data movement, the data processing, and the data interactivity, and the operational parameters associated with the data movement, the data processing, and the data interactivity.

According to examples, for the method 2200, generating, based on the determined specifications, the data acceleration architectural layout to meet the levels of capabilities respectively needed for the data movement, the data processing, and the data interactivity, and the operational parameters associated with the data movement, the data processing, and the data interactivity may further include generating, based on the determined specifications, the data acceleration architectural layout from the fourteen architectural layouts that include the appliance 118, the big data platform 114 and the appliance 118, the streaming to the appliance 118, the big data platform 114, the streaming to the big data platform 114, the big data platform 114 and in-memory analytics 126, the streaming to the big data platform 114 and the in-memory analytics 126, the big data platform 114 with a query processor 124, the streaming to the big data platform 114 and the query processor 124, the distributed cache 122, the big data platform 114 to the distributed cache 122, the IMDB 120, the big data platform 114 and the IMDB 120, and the streaming to the IMDB 120, to meet the levels of capabilities respectively needed for the data movement, the data processing, and the data interactivity, and the operational parameters associated with the data movement, the data processing, and the data interactivity.

Referring to FIGS. 1-21 and 23, and particularly to the method 2300 shown in FIG. 23, at block 2302, the method 2300 may include receiving (e.g., by the capability level and operational parameter receiver 102), by a processor, indications of levels of capabilities respectively needed for data movement, data processing, and data interactivity.

At block 2304, the method 2300 may include determining (e.g., by the data movement, processing, and interactivity determiner 112), by the processor, based on an analysis of the received indications of the levels of capabilities respectively needed for the data movement, the data processing, and the data interactivity, specifications for the data movement from streaming and batch, data processing from the big data platform 114, complex event processing, and the appliance 118, and data interactivity from the in-memory database (IMDB 120) and the distributed cache 122.

At block 2306, the method 2300 may include generating (e.g., by the data acceleration architectural layout generator 128), by the processor, based on the determined specifications, the data acceleration architectural layout 108 to meet the levels of capabilities respectively needed for the data movement, the data processing, and the data interactivity.

Referring to FIGS. 1-21 and 24, and particularly to the method 2400 shown in FIG. 24, at block 2406, the method 2400 may include receiving (e.g., by the capability level and operational parameter receiver 102) indications of operational parameters associated with data movement, data processing, and data interactivity.

At block 2408, the method 2400 may include determining (e.g., by the data movement, processing, and interactivity determiner 112), based on an analysis of the received indications of the operational parameters associated with the data movement, the data processing, and the data interactivity, specifications for the data movement to include streaming and/or batch, data processing to include the big data platform 114, CEP, and/or the appliance 118, and data interactivity to include the IMDB 120 and/or the distributed cache 122.

At block 2410, the method 2400 may include generating (e.g., by the data acceleration architectural layout generator 128), based on the determined specifications, the data acceleration architectural layout 108 to meet the operational parameters associated with the data movement, the data processing, and the data interactivity.

At block 2412, the method 2400 may include accessing (e.g., by the data anomaly analyzer 130) the data 110 that is to be analyzed for an anomaly.

At block 2414, the method 2400 may include determining (e.g., by the data anomaly analyzer 130), by using the data acceleration architectural layout, whether the data 110 includes the anomaly.

At block 2416, in response to a determination that the data includes the anomaly, the method 2400 may include controlling (e.g., by the device controller 132) the device 134 associated with the data 110.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A data acceleration apparatus comprising:
   a processor; and
   a memory storing machine readable instructions that when executed by the processor cause the processor to:
      receive indications of at least one of
         levels of capabilities respectively needed for data movement, data processing, and data interactivity, or operational parameters associated with the data movement, the data processing, and the data interactivity;

determine, based on an analysis of the received indications of the at least one of
the levels of capabilities respectively needed for the data movement, the data processing, and the data interactivity, or
the operational parameters associated with the data movement, the data processing, and the data interactivity, specifications for the
data movement to include at least one of streaming or batch,
data processing to include at least one of a big data platform, complex event processing (CEP), or an appliance, and
data interactivity to include at least one of an in-memory database (IMDB) or a distributed cache;

generate, based on the determined specifications, a data acceleration architectural layout to meet the at least one of
the levels of capabilities respectively needed for the data movement, the data processing, and the data interactivity, or
the operational parameters associated with the data movement, the data processing, and the data interactivity;
access data that is to be analyzed for an anomaly;
determine, by using the data acceleration architectural layout, whether the data includes the anomaly; and
in response to a determination that the data includes the anomaly, control a device associated with the data.

2. The data acceleration apparatus according to claim 1, wherein the data movement includes transport of data from a first location to a second location by using the data acceleration architectural layout.

3. The data acceleration apparatus according to claim 1, wherein the data processing includes
extraction of actionable insights from data, and
implementation of computer clusters to increase a processing rate of the data.

4. The data acceleration apparatus according to claim 1, wherein the data interactivity includes analyzing data by using at least one of the IMDB or the distributed cache.

5. The data acceleration apparatus according to claim 1, wherein the big data platform includes a big data core including a distributed data storage.

6. The data acceleration apparatus according to claim 1, wherein the CEP includes tracking and processing streams of event data from multiple sources to infer and identify patterns in the event data.

7. The data acceleration apparatus according to claim 1, wherein the IMDB includes database management that uses the memory for data storage.

8. The data acceleration apparatus according to claim 1, wherein the distributed cache includes cache clusters that are maintained in the memory to provide access to frequently accessed data.

9. The data acceleration apparatus according to claim 1, wherein the appliance includes a prepackaged unit of hardware, and software, wherein the hardware includes at least one of a server, the memory, a storage, or input/output channels, wherein the software includes an operating system, a database management system, and an administrative management software, and wherein the hardware includes customized silicon.

10. The data acceleration apparatus according to claim 1, wherein the machine readable instructions to generate, based on the determined specifications, the data acceleration architectural layout to meet the at least one of
the levels of capabilities respectively needed for the data movement, the data processing, and the data interactivity, or
the operational parameters associated with the data movement, the data processing, and the data interactivity further comprise machine readable instructions to cause the processor to:
generate, based on the determined specifications, the data acceleration architectural layout from fourteen architectural layouts to meet the at least one of
the levels of capabilities respectively needed for the data movement, the data processing, and the data interactivity, or
the operational parameters associated with the data movement, the data processing, and the data interactivity.

11. The data acceleration apparatus according to claim 10, wherein the machine readable instructions to generate, based on the determined specifications, the data acceleration architectural layout to meet the at least one of
the levels of capabilities respectively needed for the data movement, the data processing, and the data interactivity, or
the operational parameters associated with the data movement, the data processing, and the data interactivity further comprise machine readable instructions to cause the processor to:
generate, based on the determined specifications, the data acceleration architectural layout from the fourteen architectural layouts that include the appliance, the big data platform and the appliance, the streaming to the appliance, the big data platform, the streaming to the big data platform, the big data platform and in-memory analytics, the streaming to the big data platform and the in-memory analytics, the big data platform with a query processor, the streaming to the big data platform and the query processor, the distributed cache, the big data platform to the distributed cache, the IMDB, the big data platform and the IMDB, and the streaming to the IMDB, to meet the at least one of
the levels of capabilities respectively needed for the data movement, the data processing, and the data interactivity, or
the operational parameters associated with the data movement, the data processing, and the data interactivity.

12. A method for data acceleration, the method comprising:
receiving, by at least one processor, indications of levels of capabilities respectively needed for data movement, data processing, and data interactivity;
determining, by the at least one processor, based on an analysis of the received indications of the levels of capabilities respectively needed for the data movement, the data processing, and the data interactivity, specifications for the
data movement from streaming and batch,
data processing from a big data platform, complex event processing (CEP), and an appliance, and
data interactivity from an in-memory database (IMDB) and a distributed cache;
generating, by the at least one processor, based on the determined specifications, a data acceleration architectural layout to meet the levels of capabilities respectively needed for the data movement, the data processing, and the data interactivity;
accessing, by the at least one processor, data that is to be analyzed for an anomaly;
determining, by the at least one processor and by using the data acceleration architectural layout, whether the data includes the anomaly; and
in response to a determination that the data includes the anomaly, controlling, by the at least one processor, a device associated with the data.

13. The method of claim 12, further comprising:
using, for the data movement, the data acceleration architectural layout to transport data from a first location to a second location.

14. The method of claim 12, further comprising:
extracting, for the data processing, actionable insights from data; and
implementing, for the data processing, computer clusters to increase a processing rate of the data.

15. The method of claim 12, further comprising:
analyzing, for the data interactivity, data by using at least one of the IMDB or the distributed cache.

16. A non-transitory computer readable medium having stored thereon machine readable instructions for data acceleration, the machine readable instructions, when executed, cause a processor to:
receive indications of operational parameters associated with data movement, data processing, and data interactivity;
determine, based on an analysis of the received indications of the operational parameters associated with the data movement, the data processing, and the data interactivity, specifications for the
data movement to include at least one of streaming or batch,
data processing to include at least one of a big data platform, complex event processing (CEP), or an appliance, and
data interactivity to include at least one of an in-memory database (IMDB) or a distributed cache;
generate, based on the determined specifications, a data acceleration architectural layout to meet the operational parameters associated with the data movement, the data processing, and the data interactivity;
access data that is to be analyzed for an anomaly;
determine, by using the data acceleration architectural layout, whether the data includes the anomaly; and
in response to a determination that the data includes the anomaly, control a device associated with the data.

17. The non-transitory computer readable medium of claim 16, wherein the big data platform includes a big data core including a distributed data storage, and wherein the CEP includes tracking and processing streams of event data from multiple sources to infer and identify patterns in the event data.

18. The non-transitory computer readable medium of claim 16, wherein the IMDB includes database management that uses memory for data storage, and wherein the distributed cache includes cache clusters that are maintained in the memory to provide access to frequently accessed data.

19. The non-transitory computer readable medium of claim 16, wherein the appliance includes a prepackaged unit of hardware, and software, wherein the hardware includes at least one of a server, memory, a storage, or input/output channels, wherein the software includes an operating system, a database management system, and an administrative management software, and wherein the hardware includes customized silicon.

20. The non-transitory computer readable medium of claim 16, wherein the machine readable instructions to generate, based on the determined specifications, the data acceleration architectural layout to meet the operational parameters associated with the data movement, the data processing, and the data interactivity, when executed, further cause the processor to:
generate, based on the determined specifications, the data acceleration architectural layout from architectural layouts that include the appliance, the big data platform and the appliance, the streaming to the appliance, the big data platform, the streaming to the big data platform, the big data platform and in-memory analytics, the streaming to the big data platform and the in-memory analytics, the big data platform with a query processor, the streaming to the big data platform and the query processor, the distributed cache, the big data platform to the distributed cache, the IMDB, the big data platform and the IMDB, and the streaming to the IMDB, to meet the operational parameters associated with the data movement, the data processing, and the data interactivity.

* * * * *